(12) United States Patent
Tsukao et al.

(10) Patent No.: US 12,331,573 B2
(45) Date of Patent: Jun. 17, 2025

(54) OBSTACLE DETECTION DEVICE, AND METHOD

(71) Applicant: AISIN CORPORATION, Aichi (JP)

(72) Inventors: Kosuke Tsukao, Kariya (JP); Nobuyasu Miwa, Kariya (JP); Tatsuma Fujita, Kariya (JP)

(73) Assignee: AISIN CORPORATION, Kariya (JP)

( * ) Notice: Subject to any disclaimer, the term of this patent is extended or adjusted under 35 U.S.C. 154(b) by 428 days.

(21) Appl. No.: 17/583,448

(22) Filed: Jan. 25, 2022

(65) Prior Publication Data

US 2022/0259914 A1 Aug. 18, 2022

(30) Foreign Application Priority Data

Feb. 12, 2021 (JP) ................. 2021-021323

(51) Int. Cl.
*E05F 15/40* (2015.01)
*E05F 15/43* (2015.01)
(Continued)

(52) U.S. Cl.
CPC ............. *E05F 15/40* (2015.01); *G01S 15/86* (2020.01); *G01S 15/931* (2013.01); *G06V 10/255* (2022.01); *G06V 20/58* (2022.01); *H04N 23/71* (2023.01); *H04N 23/76* (2023.01); *E05F 2015/433* (2015.01); *E05F 2015/434* (2015.01); *E05Y 2400/44* (2013.01); *E05Y 2400/54* (2013.01); *E05Y 2900/531* (2013.01); *G01S 2015/937* (2013.01)

(58) Field of Classification Search
CPC ................ E05F 15/40; E05F 2015/433; E05F 2015/434; G01S 15/86; G01S 15/931; G01S 2015/937; G06V 20/58; G06V 10/255; H04N 23/76; H04N 23/71; E05Y 2400/44; E05Y 2400/54; E05Y 2900/531
See application file for complete search history.

(56) References Cited

U.S. PATENT DOCUMENTS

| 12,023,998 B2 | 7/2024 | Ichinose |
| 2018/0016835 A1 | 1/2018 | Ichinose |

(Continued)

FOREIGN PATENT DOCUMENTS

| JP | 2005-076408 A | 3/2005 |
| JP | 2007-140852 A | 6/2007 |

(Continued)

*Primary Examiner* — Andrew J Cromer
(74) *Attorney, Agent, or Firm* — Sughrue Mion, PLLC

(57) ABSTRACT

An obstacle detection device includes: an ultrasonic sensor signal processing unit detecting at least a distance to an obstacle among the distance and a shape of the obstacle based on an output of an ultrasonic sensor, the ultrasonic sensor being disposed on a door of a vehicle and detecting the distance within a predetermined detection range by an ultrasonic wave; a camera image processing unit detecting the distance and the shape based on an output of a camera of the vehicle, the camera capturing an image of an area including a trajectory range when the door is opened and a detection range of the ultrasonic sensor; and a controller performing open operation control of the door based on detection results of the ultrasonic sensor signal processing unit and the camera image processing unit.

11 Claims, 21 Drawing Sheets

(51) Int. Cl.
  *G01S 15/86*     (2020.01)
  *G01S 15/931*    (2020.01)
  *G06V 10/20*     (2022.01)
  *G06V 20/58*     (2022.01)
  *H04N 23/71*     (2023.01)
  *H04N 23/76*     (2023.01)

(56) References Cited

U.S. PATENT DOCUMENTS

2020/0019797 A1* 1/2020 Matsuura ................. G01S 15/86
2020/0386035 A1* 12/2020 Battlogg ................ E05F 15/611
2022/0089003 A1* 3/2022 Ichinose ............... E05F 15/655

FOREIGN PATENT DOCUMENTS

| JP | 2007-176293 A | 7/2007 |
| JP | 2016-135962 A | 7/2016 |
| JP | 2018-009386 A | 1/2018 |
| JP | 2018-165945 A | 10/2018 |
| JP | 2019-095386 A | 6/2019 |
| JP | 2020-105812 A | 7/2020 |

* cited by examiner

FIG.25
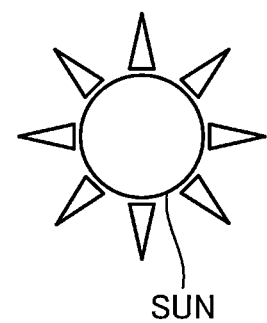
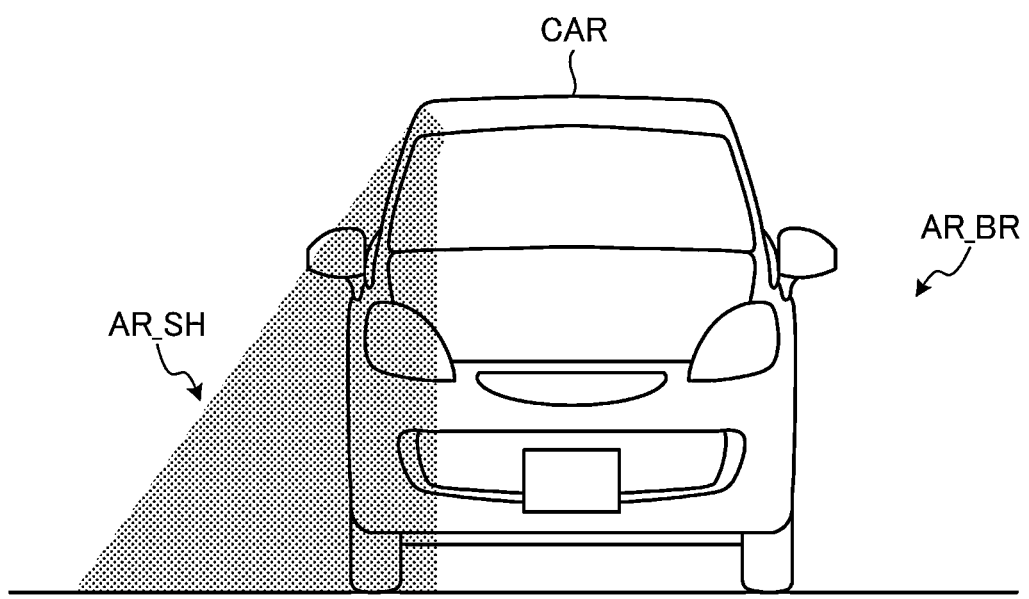

OBSTACLE DETECTION DEVICE, AND METHOD

CROSS REFERENCE TO RELATED APPLICATIONS

This application is based on and claims priority under 35 U.S.C. § 119 to Japanese Patent Application 2021-021323, filed on Feb. 12, 2021, the entire content of which is incorporated herein by reference.

TECHNICAL FIELD

This disclosure relates to an obstacle detection device, and method.

BACKGROUND DISCUSSION

In the related art, there has been known a technique of detecting an obstacle around a door of a vehicle by using a camera, an ultrasonic sensor, or the like, and controlling the door (for example, controlling an open degree of the door) so as not to come into contact with the detected obstacle.

Examples of the related art include JP 2018-009386 and JP 2005-076408.

For example, in a device that controls the door by using a monocular camera, in a state in which the monocular camera is not moved, since an accurate distance to the obstacle cannot be known, the door cannot be controlled to stop immediately before a collision with the obstacle.

In addition, even in the case where an obstacle having a complicated shape is detected only by the ultrasonic sensor, a risk may occur such that a portion that may first come into contact with the door cannot be detected, or that the door may collide with the obstacle due to a large detection error.

A need thus exists for an obstacle detection device and method which are not susceptible to the drawback mentioned above.

SUMMARY

An obstacle detection device according to an aspect of this disclosure includes: an ultrasonic sensor signal processing unit configured to detect at least a distance to an obstacle among the distance to the obstacle and a shape of the obstacle based on an output of an ultrasonic sensor, the ultrasonic sensor being disposed on a door of a vehicle and configured to detect the distance to the obstacle within a predetermined detection range by an ultrasonic wave; a camera image processing unit configured to detect the distance to the obstacle and the shape of the obstacle based on an output of a camera of the vehicle, the camera being configured to capture an image of an area including a trajectory range when the door of the vehicle is opened and a detection range of the ultrasonic sensor; and a controller configured to perform open operation control of the door based on a detection result of the ultrasonic sensor signal processing unit and a detection result of the camera image processing unit.

An obstacle detection method according to an aspect of this disclosure is executed by an obstacle detection device to which an output from an ultrasonic sensor, which is disposed on a door of a vehicle and configured to detect a distance to an obstacle within a predetermined detection range by an ultrasonic wave, and an output of a camera of the vehicle, which is configured to capture an image of an area including a trajectory range when the door of the vehicle is opened and a detection range of the ultrasonic sensor, are input, the method including a first process of detecting at least the distance to the obstacle among the distance to the obstacle and a shape of the obstacle based on the output from the ultrasonic sensor, a second process of detecting the distance to the obstacle and the shape of the obstacle based on the output of the camera, and a third process of performing open operation control of the door based on detection results of the first process and the second process.

BRIEF DESCRIPTION OF THE DRAWINGS

The foregoing and additional features and characteristics of this disclosure will become more apparent from the following detailed description considered with the reference to the accompanying drawings, wherein:

FIG. 25 is an explanatory diagram of a principle of the third embodiment;

DETAILED DESCRIPTION

Hereinafter, exemplary embodiments disclosed here will be disclosed. Configurations of the embodiments described below and actions, results, and effects provided by such configurations are examples. The disclosure can be implemented by configurations other than those disclosed in the following embodiments, and at least one of various effects based on the basic configurations and derived effects can be obtained.

[1] First Embodiment

Figure 1:
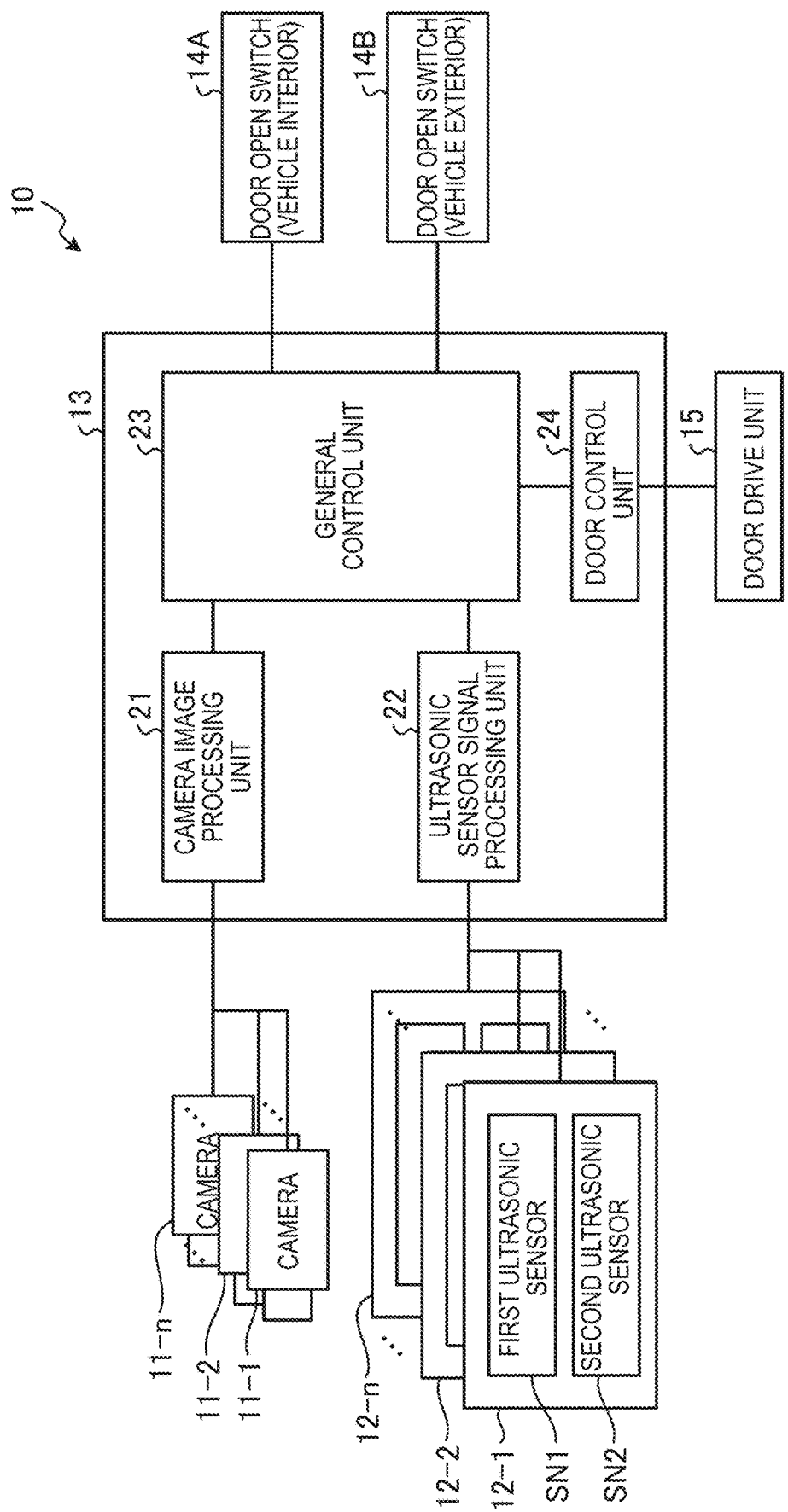
FIG. 1 is a schematic configuration block diagram of an obstacle detection device according to a first embodiment.

FIG. 1 is a schematic configuration block diagram of an obstacle detection device according to a first embodiment.

An obstacle detection device 10 includes a plurality of cameras 11-1 to 11-$n$, a plurality of ultrasonic sensor groups 12-1 to 12-$n$, a controller 13, a door open switch (interior of the vehicle) 14A, a door open switch (exterior of the vehicle) 14B, and a door drive unit 15.

The plurality of cameras 11-1 to 11-$n$ are disposed at positions where images of doors corresponding to the cameras can be captured. Capturing ranges of the cameras 11-1 to 11-$n$ are ranges where the images of the doors are captured from a closed state to a full-opened state of the respective doors.

In the above configuration, the controller 13 is a so-called microcomputer, and controls the obstacle detection device 10 based on a control program stored in advance.

Each of the ultrasonic sensor groups 12-1 to 12-$n$ includes a first ultrasonic sensor SN1 and a second ultrasonic sensor SN2 disposed in a front-rear direction of the vehicle.

The controller 13 controls the entire obstacle detection device 10. The controller 13 includes a camera image processing unit 21, an ultrasonic sensor signal processing unit 22, a general control unit 23, and a door control unit 24.

In the above configuration, the camera image processing unit 21 processes camera images output from the plurality of cameras 11-1 to 11-$n$, and outputs processing results to the general control unit 23. In this case, the camera image processing unit 21 determines presence or absence of an obstacle, estimates a shape of the obstacle (object detection), and calculates an allowable door open degree.

The ultrasonic sensor signal processing unit 22 processes output signals of the first ultrasonic sensor SN1 and the second ultrasonic sensor SN2, which constitute each of the plurality of ultrasonic sensor groups 12-1 to 12-$n$, and outputs processed output signals to the general control unit 23. In this case, the ultrasonic sensor signal processing unit 22 determines the presence or absence of the obstacle, estimates the shape of the obstacle, and calculates the allowable door open degree.

The general control unit 23 controls the entire controller 13. When the door open switch (interior of the vehicle) 14A or the door open switch (exterior of the vehicle) 14B is operated, drive control of the door is performed by the door control unit 24 based on outputs of the camera image processing unit 21 and the ultrasonic sensor signal processing unit 22.

The door control unit 24 controls the door drive unit 15 under the control of the general control unit 23 to perform the drive control of the door (control of the door open degree and the like).

The door open switch (interior of the vehicle) 14A is disposed in a vehicle cabin, and is operated when an occupant opens the door.

The door open switch (exterior of the vehicle) 14B is disposed outside the vehicle, and is operated when the door is opened and the occupant is going to get on the vehicle.

The door open switch (interior of the vehicle) 14A and the door open switch (exterior of the vehicle) 14B are mechanical switches, electrostatic switches, or remote controller switches. The door open switch (interior of the vehicle) 14A and the door open switch (exterior of the vehicle) 14B can be configured by software so as to detect a position or behavior of a user (the occupant) by the camera or a radio wave sensor and operate by using the position or the behavior as a trigger.

The door drive unit 15 performs unlock or lock control and open or close control of the door under the control of the door control unit 24.

Figure 2:
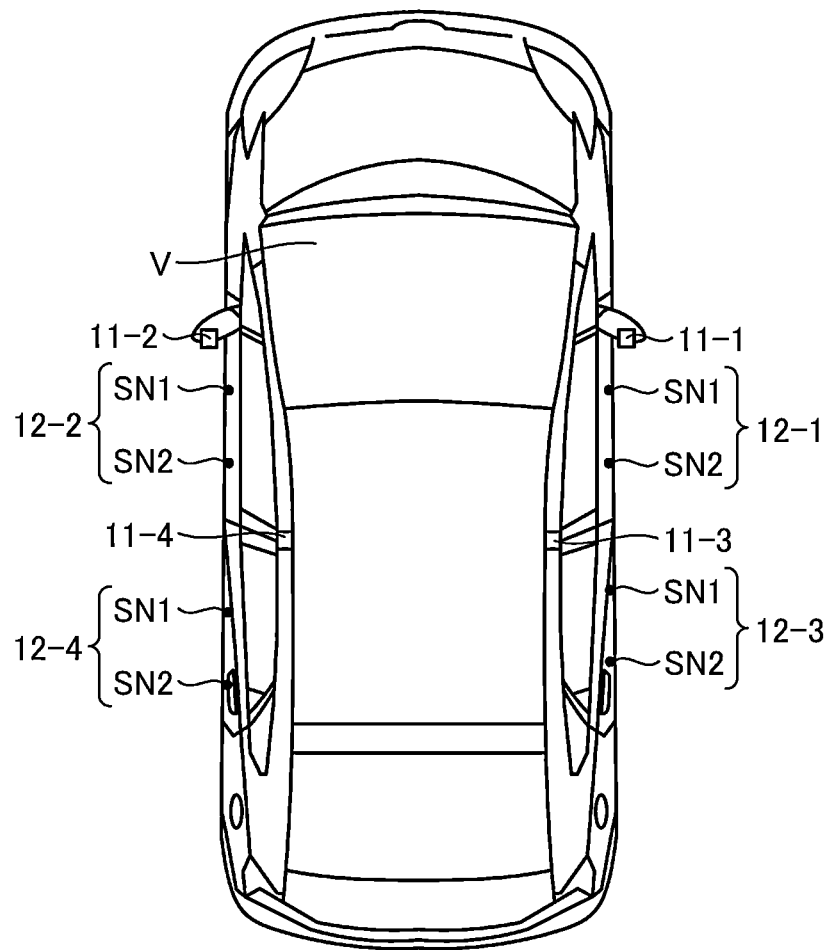
FIG. 2 is a plan view of a vehicle including the obstacle detection device according to the first embodiment.

FIG. 2 is a plan view of a vehicle including the obstacle detection device according to the first embodiment.

Figure 3:
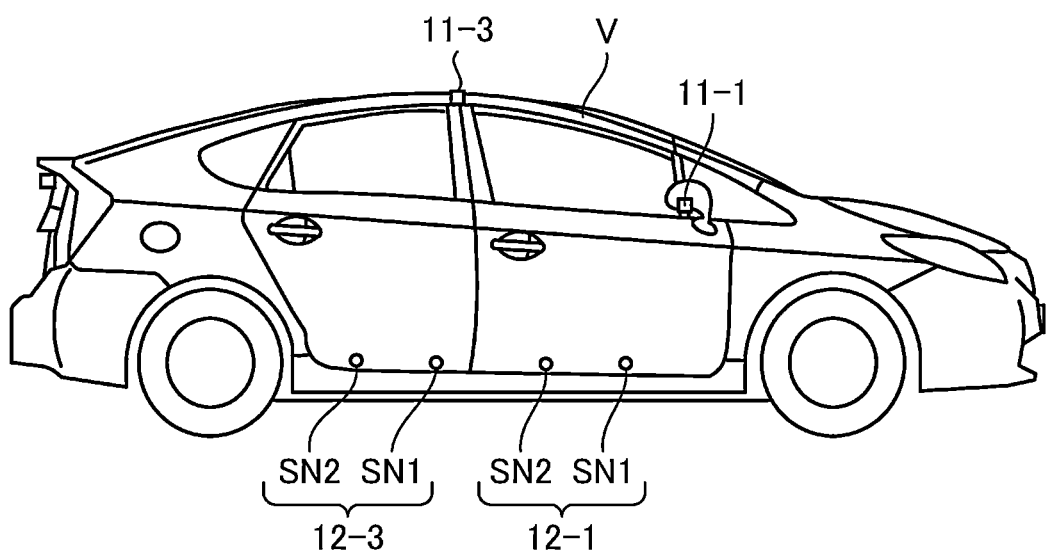
FIG. 3 is a right side view of the vehicle including the obstacle detection device according to the first embodiment.

FIG. 3 is a right side view of the vehicle including the obstacle detection device according to the first embodiment.

In FIG. 2, for ease of understanding, a case where four cameras 11-1 to 11-4 and ultrasonic sensor groups 12-1 to 12-4 corresponding to the cameras 11-1 to 11-4 are disposed will be described as an example.

In FIG. 2, an upward direction is a forward direction of a vehicle V, a downward direction is a rearward direction of the vehicle V, a right direction is a rightward direction of the vehicle V, and a left direction is a leftward direction of the vehicle V. In FIG. 3, the right direction is the forward direction of the vehicle V, and the left direction is the rearward direction of the vehicle V.

As shown in FIG. 2 or FIG. 3, the camera 11-1 that captures an image of a right front door is disposed on a right side mirror of the vehicle V. The camera 11-2 that captures an image of a left front door is disposed on a left side mirror of the vehicle V. The camera 11-3 that captures an image of a right rear door is disposed at an upper portion of a right center pillar of the vehicle V. The camera 11-4 that captures an image of a left rear door is disposed at an upper portion of a left center pillar of the vehicle V.

The ultrasonic sensor group 12-1 is disposed on, for example, a lower garnish of the right front door of the vehicle V. The ultrasonic sensor group 12-2 is disposed on, for example, a lower garnish of the left front door of the vehicle V. The ultrasonic sensor group 12-3 is disposed on, for example, a lower garnish of the right rear door of the vehicle V. The ultrasonic sensor group 12-4 is disposed on, for example, a lower garnish of the left rear door of the vehicle V.

Figure 4:
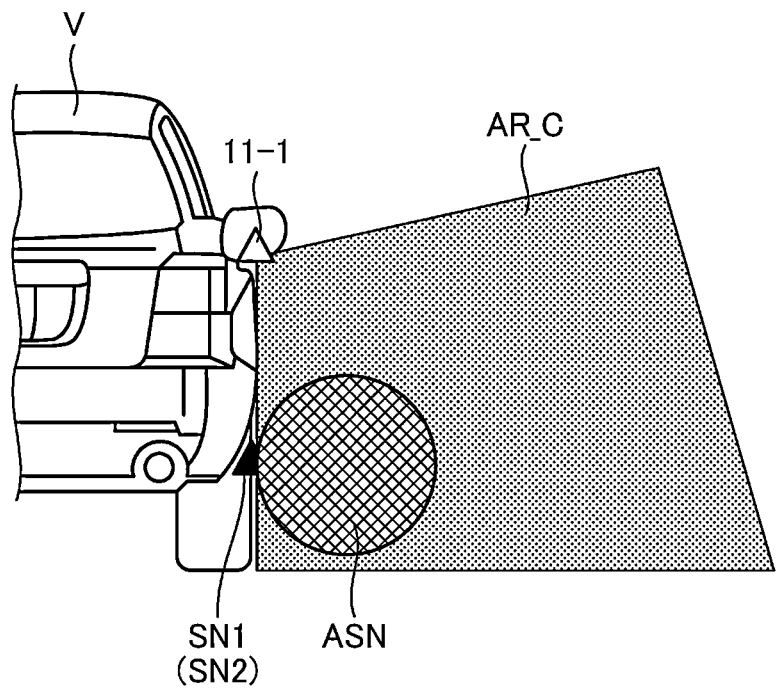
FIG. 4 is a diagram illustrating a detection range of a camera and a detection range of an ultrasonic sensor when viewed from the rear of the vehicle.

FIG. 4 is a diagram illustrating a detection range of the camera and a detection range of the ultrasonic sensor when viewed from the rear of the vehicle.

Figure 5:
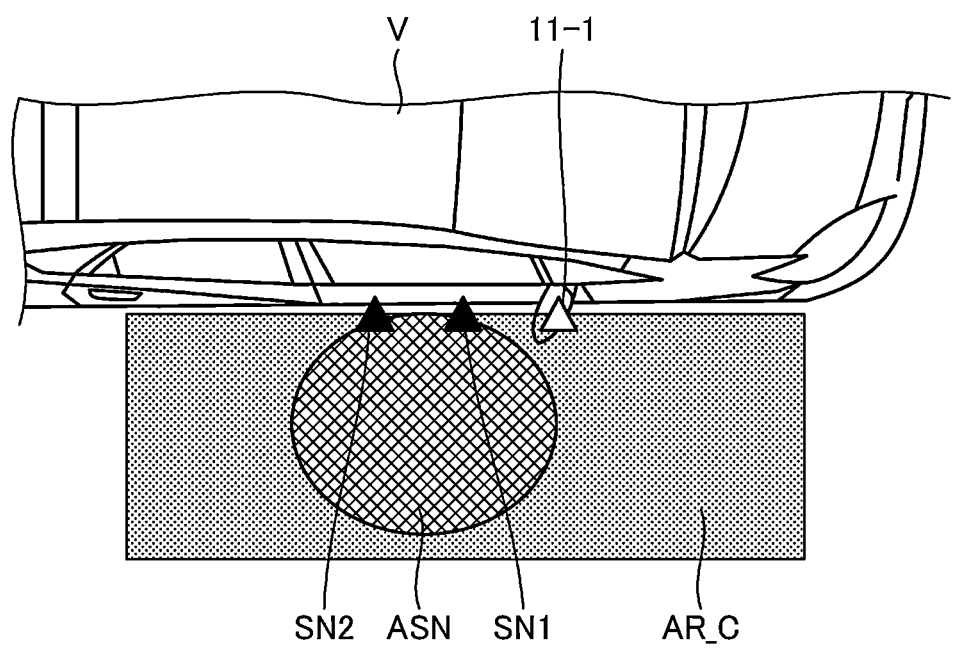
FIG. 5 is a diagram illustrating a detection range of the camera and a detection range of the ultrasonic sensor when viewed from above the vehicle.

FIG. 5 is a diagram illustrating a detection range of the camera and a detection range of the ultrasonic sensor when viewed from above the vehicle.

In FIG. 4 and FIG. 5, for ease of understanding, only the camera 11-1 and the first ultrasonic sensor SN1 and the second ultrasonic sensor SN2, which constitute the ultrasonic sensor group 12-1 are shown.

As shown in FIG. 4 and FIG. 5, a detection range ARC of the camera 11-1 includes a detection range ASN of the first ultrasonic sensor SN1 and the second ultrasonic sensor SN2, which constitute the ultrasonic sensor group 12-1.

A method of detection by the ultrasonic sensor will be described.

The first ultrasonic sensor SN1 and the second ultrasonic sensor SN2, which constitute the ultrasonic sensor group 12-1, alternately perform transmission and reception.

Figure 6:
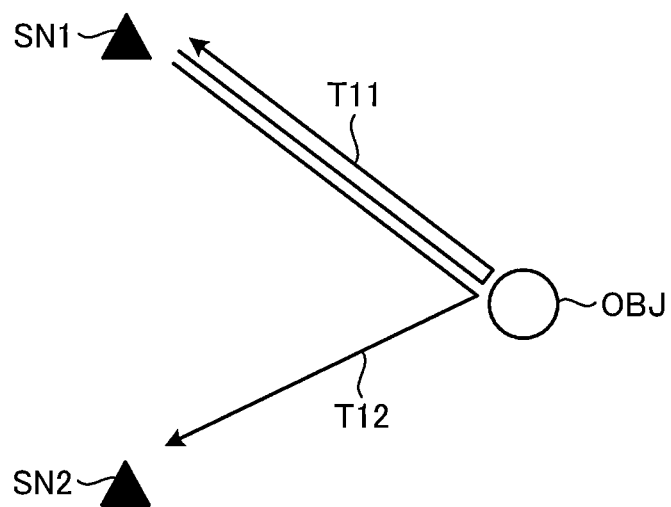
FIG. 6 is an explanatory diagram at the time of transmission of a first ultrasonic sensor.

FIG. 6 is an explanatory diagram at the time of the transmission of the first ultrasonic sensor.

When the first ultrasonic sensor SN1 transmits an ultrasonic wave, the ultrasonic wave is reflected by an obstacle OBJ, the first ultrasonic sensor SN1 receives an ultrasonic wave T11, and the second ultrasonic sensor SN2 receives an ultrasonic wave T12.

In this case, a difference between a transmission timing of the first ultrasonic sensor SN1 and a reception timing of the ultrasonic wave T11 of the first ultrasonic sensor SN1 corresponds to a distance (twice the distance) between the first ultrasonic sensor SN1 and the obstacle OBJ.

A difference between the transmission timing of the first ultrasonic sensor SN1 and a reception timing of the ultrasonic wave T12 of the second ultrasonic sensor SN2 corresponds to a distance between the first ultrasonic sensor SN1 and the second ultrasonic sensor SN2 via the obstacle OBJ.

Figure 7:
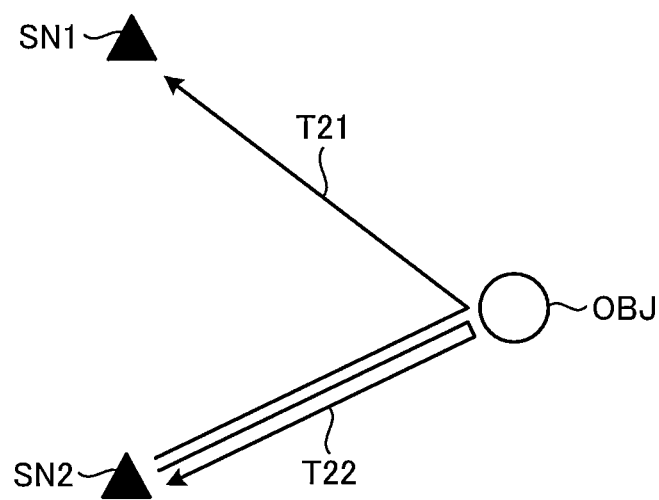
FIG. 7 is an explanatory diagram at the time of transmission of a second ultrasonic sensor.

FIG. 7 is an explanatory diagram at the time of the transmission of the second ultrasonic sensor.

When the second ultrasonic sensor SN2 transmits an ultrasonic wave, the ultrasonic wave is reflected by the obstacle OBJ, the first ultrasonic sensor SN1 receives an ultrasonic wave T21, and the second ultrasonic sensor SN2 receives an ultrasonic wave T22.

In this case, a difference between a transmission timing of the second ultrasonic sensor SN2 and a reception timing of the ultrasonic wave T21 of the first ultrasonic sensor SN1 corresponds to a distance between the second ultrasonic sensor SN2 and the first ultrasonic sensor SN1 via the obstacle OBJ.

The difference between the transmission timing of the second ultrasonic sensor SN2 and the reception timing of the ultrasonic wave T21 of the first ultrasonic sensor SN1 corresponds to a distance (twice the distance) between the second ultrasonic sensor SN2 and the obstacle OBJ.

Figure 8:
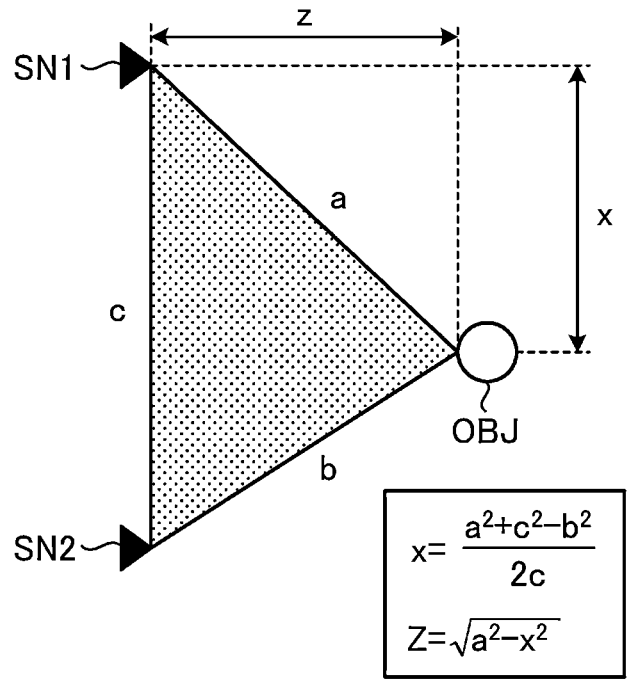
FIG. 8 is an explanatory diagram of position detection of an obstacle.

FIG. 8 is an explanatory diagram of position detection of the obstacle.

A distance a and a distance b in FIG. 8 can be calculated from detection results of FIG. 6 and FIG. 7. Since a distance c between the first ultrasonic sensor SN1 and the second ultrasonic sensor SN2 is known in advance, a distance x and a distance z can be calculated by a principle of trilateration as shown in FIG. 8.

Next, shape estimation of the obstacle by the ultrasonic sensor will be described.

Figure 9:
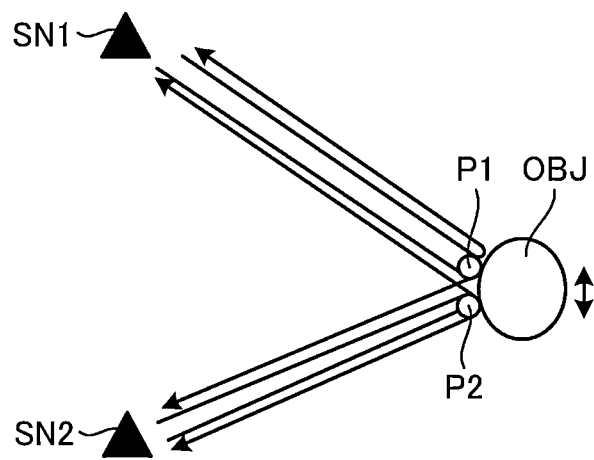
FIG. 9 is an explanatory diagram in a case of a pole-type obstacle in which the obstacle is pole-shaped (pillar-shaped)

FIG. 9 is an explanatory diagram in a case of a pole-type obstacle in which the obstacle is pole-shaped (pillar-shaped).

As shown in FIG. 9, when an obstacle coordinate P1 calculated at the time of the transmission of the first ultrasonic sensor SN1 and an obstacle coordinate P2 calculated at the time of the transmission of the second ultrasonic sensor SN2 are close to each other, the ultrasonic sensor signal processing unit 22 determines that the obstacle is the pole-type obstacle.

Figure 10:
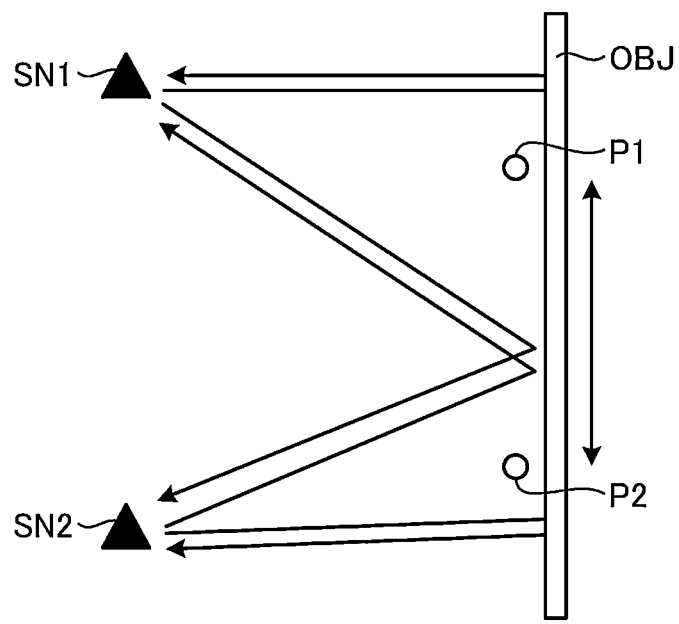
FIG. 10 is an explanatory diagram in a case of a wall-type obstacle in which the obstacle is wall-shaped.

FIG. 10 is an explanatory diagram in a case of a wall-type obstacle in which the obstacle is wall-shaped.

As shown in FIG. 10, when the obstacle coordinate P1 calculated at the time of the transmission of the first ultrasonic sensor SN1 and the obstacle coordinate P2 calculated at the time of the transmission of the second ultrasonic sensor SN2 are separated from each other, the ultrasonic sensor signal processing unit 22 determines that the obstacle is the wall-type obstacle.

Next, a method for detecting an obstacle to which a door may collide when the door opens in the case where the obstacle is the pole-type obstacle will be described.

In the following description, a case where two obstacles OBJ1 and OBJ2 are detected as the pole-type obstacles will be described as an example.

Figure 11:
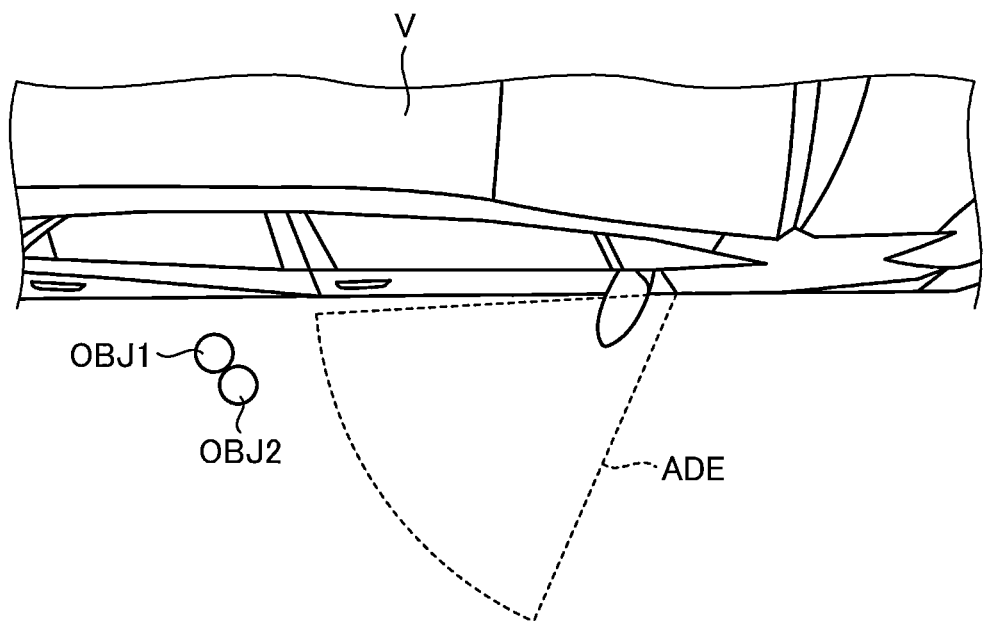
FIG. 11 is an explanatory diagram when an obstacle that may be collided is not detected.

FIG. 11 is an explanatory diagram when an obstacle that may be collided is not detected.

When the two obstacles OBJ1 and OBJ2 are detected, as shown in FIG. 11, the ultrasound sensor signal processing unit 22 determines that there is no obstacle when the ultrasound sensor signal processing unit 22 determines that none of the two obstacles OBJ1 and OBJ2 is included in a door trajectory area ADE when the door of the vehicle V is opened.

Figure 12:
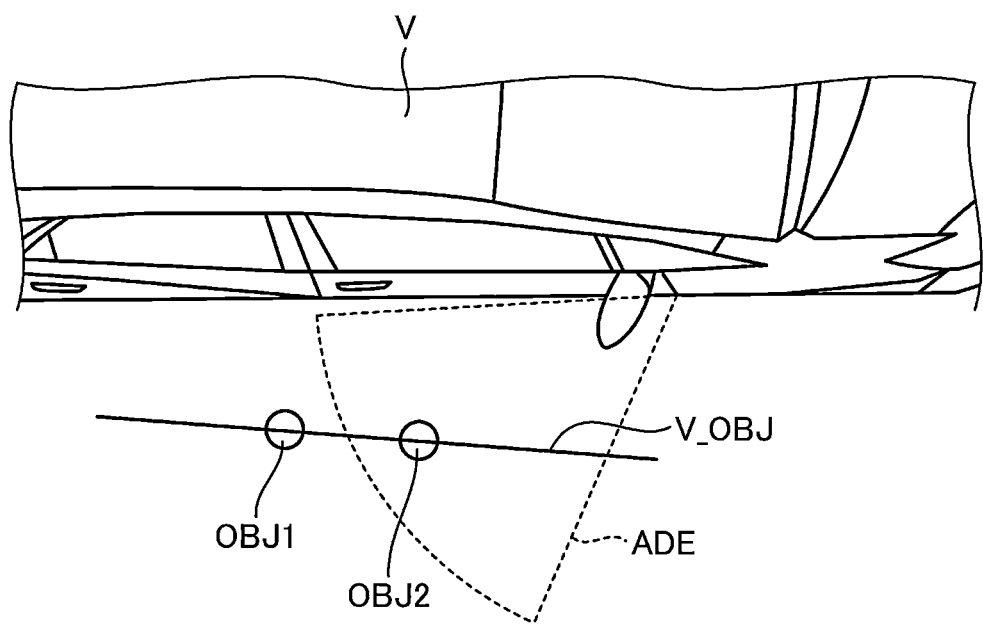
FIG. 12 is an explanatory diagram when an obstacle that may be collided is detected.

FIG. 12 is an explanatory diagram when the obstacle that may be collided is detected.

When the two obstacles OBJ1 and OBJ2 are detected, as shown in FIG. 11, the ultrasound sensor signal processing unit 22 determines that there is an obstacle when the ultrasound sensor signal processing unit 22 determines that at least one (the obstacle OBJ2 in an example of FIG. 12) of the two obstacles OBJ1 and OBJ2 is included in the door trajectory area ADE when the door of the vehicle V is opened.

Next, door control at the time of obstacle detection by the ultrasonic sensor will be described.

Figure 13:
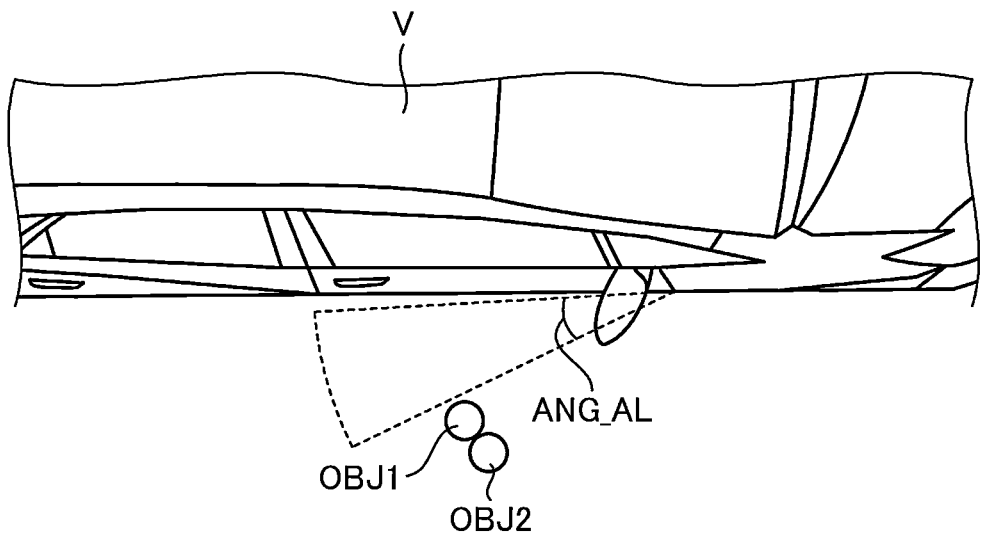
FIG. 13 is an explanatory diagram of door control when a plurality of detected obstacles are included in a door trajectory area.

FIG. 13 is an explanatory diagram of the door control when a plurality of detected obstacles are included in the door trajectory area.

When the plurality of detected obstacles are included in the door trajectory area, the ultrasonic sensor signal processing unit 22 calculates a maximum door open degree that does not cause a collision with the obstacle (obstacle OBJ1 in FIG. 13) that may be collided with the door first when the door is opened from a fully-closed state as an allowable door open degree ANG_AL.

Accordingly, the general control unit 23 controls the door drive unit 15 via the door control unit 24 and opens the door to the allowable door open degree ANG_AL shown in FIG. 13.

Figure 14:
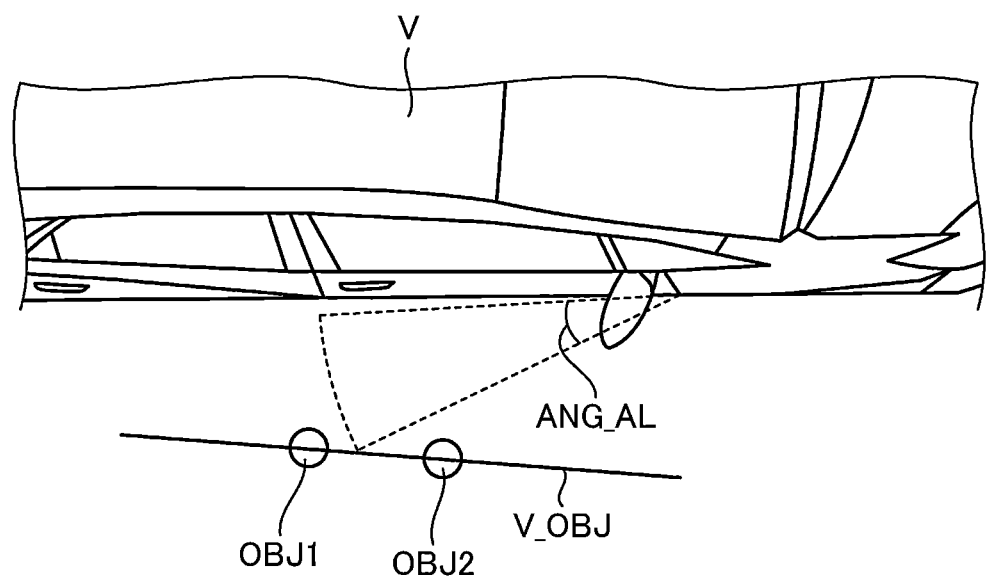
FIG. 14 is an explanatory diagram of the door control when a plurality of obstacles are detected.

FIG. 14 is an explanatory diagram of the door control when a plurality of obstacles are detected.

In an example of FIG. 14, the plurality of obstacles are detected, but an obstacle not included in the door trajectory area is included.

In such a case, the ultrasonic sensor signal processing unit 22 connects the detected obstacles with a determination straight line V_OBJ, and calculates a maximum door open degree that does not cause a collide with the determination straight line V_OBJ when the door is opened from the fully-closed state as the allowable door open degree ANG_AL.

Figure 15:
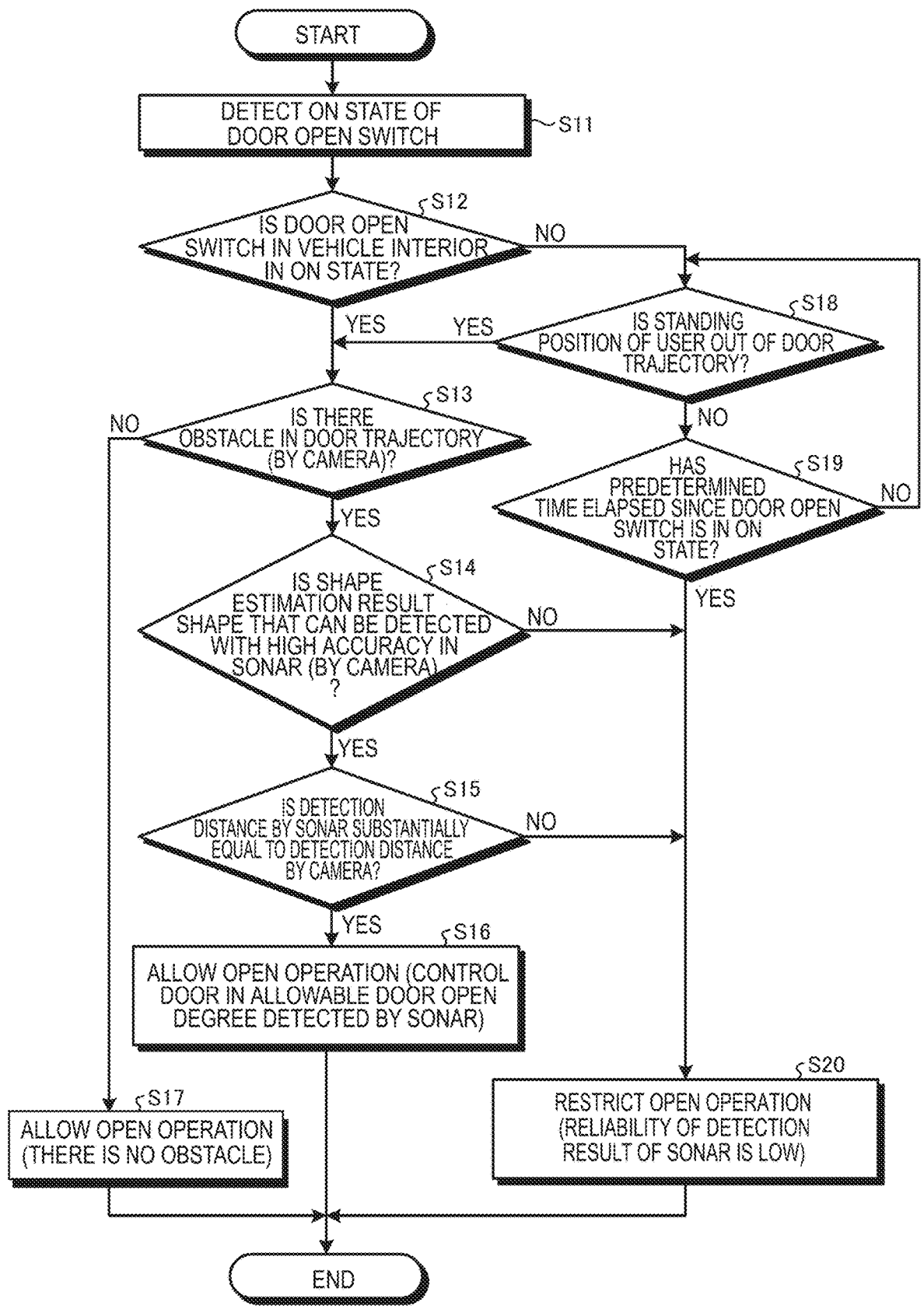
FIG. 15 is an operation flowchart of the first embodiment.

Accordingly, the general control unit 23 controls the door drive unit 15 via the door control unit 24 and opens the door to the allowable door open degree ANG_AL shown in FIG. 15.

Next, an outline of processing in the camera image processing unit 21 will be described.

The camera image processing unit 21 performs the object detection by image recognition or the like based on captured images captured by the cameras 11-1 to 11-*n*, and detects a type of the obstacle (the pole-type, the wall-type, a person, or the like) and a position of the obstacle (a position of a point closest to the vehicle V in the captured images).

In this case, in addition to the method for detecting the obstacle, in detection of the obstacle, the obstacle may be detected based on an arrangement relationship between the obstacle and the ground.

Subsequently, the camera image processing unit 21 determines the presence or absence of the obstacle in a door trajectory based on the type and position of the obstacle.

When the camera image processing unit 21 determines that there is an obstacle in the door trajectory, the camera image processing unit 21 calculates a maximum door open degree that does not cause the collision with the obstacle when the door is opened from the fully-closed state as the allowable door open degree.

Next, an operation of the first embodiment will be described.

FIG. 15 is an operation flowchart of the first embodiment.

First, when the general control unit 23 detects an ON state of the door open switch (step S11), the general control unit 23 determines whether the door open switch (interior of the vehicle) 14A is in the ON state (step S12).

In the determination of step S12, when the door open switch (interior of the vehicle) 14A is in the ON state (step S12; Yes), the general control unit 23 determines whether there is an obstacle in the door trajectory based on an output result of the camera image processing unit 21 (step S13).

In the determination of step S13, when there is an obstacle in the door trajectory (step S13; Yes), the general control unit 23 determines whether a shape determination result corresponding to the output result of the camera image processing unit 21 is a shape (a pole-type shape or a wall-type shape) that can be detected with high accuracy in the ultrasonic sensors SN1 and SN2 (described as sonars in the figure) (step S14).

In the determination of step S14, when it is determined that the shape determination result is not the shape that can be detected with high accuracy in the ultrasonic sensors SN1 and SN2 (step S14; No), the general control unit 23 proceeds to step S20.

In the determination of step S14, when it is determined that the shape determination result is the shape that can be detected with high accuracy in the ultrasonic sensors SN1 and SN2 (step S14; Yes), the general control unit 23 determines whether a detection distance to the obstacle corresponding to the output result of the ultrasonic sensor signal processing unit 22 is substantially equal to a detection distance to the obstacle corresponding to the output result of the camera image processing unit 21 (step S15).

In the determination of step S15, when it is determined that the detection distances are not substantially equal (step S15; No), the general control unit 23 proceeds to step S20.

In the determination of step S15, when it is determined that the detection distances are substantially equal (step S15; Yes), the general control unit 23 notifies the door control unit 24 that an open operation is allowed, controls the door drive unit 15 via the door control unit 24, controls the door in the allowable door open degree detected by the ultrasonic sensor signal processing unit 22, and ends the process (step S16).

A relationship among a detection result of the camera image processing unit 21, a detection result of the ultrasonic sensor signal processing unit 22, and a determination result of the general control unit 23 will be described.

Figure 16A:
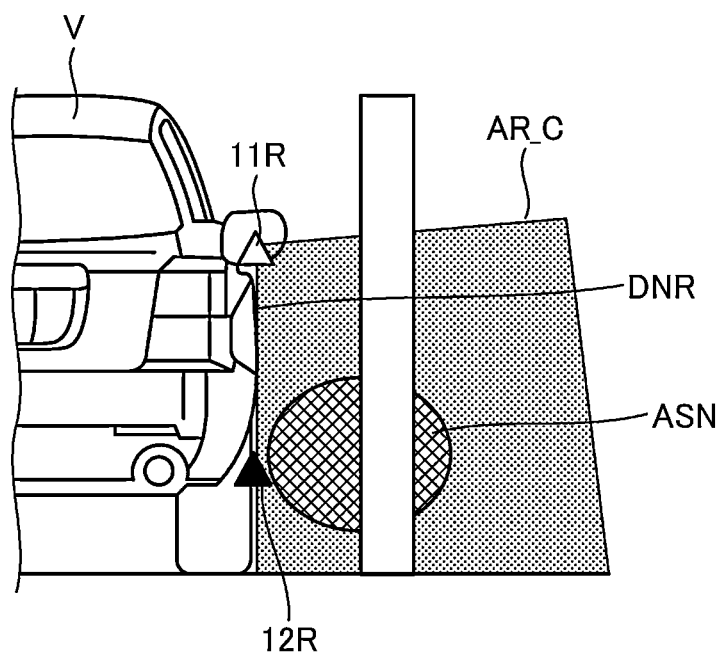
FIGS. 16A and 16B are explanatory diagrams when the obstacle is a pole (pole-type)
Figure 16B:
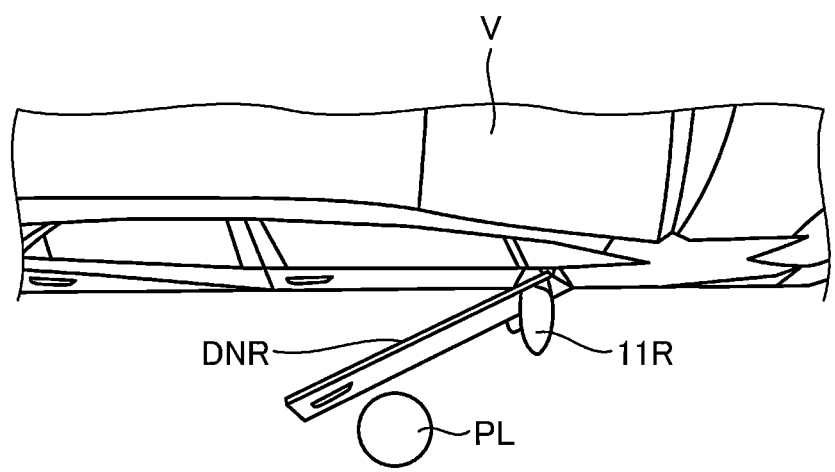

FIGS. 16A and 16B are explanatory diagrams when the obstacle is a pole (pole-type).

As shown in FIG. 16A, when the obstacle is a pole (pole-type) PL, the detection result of the camera image processing unit 21 is that there is an obstacle, and the shape of the obstacle is the pole-type.

Similarly, the detection result of the ultrasonic sensor signal processing unit 22 is also that there is an obstacle, and the shape of the obstacle is the pole-type.

As a result, the determination result of the general control unit 23 is that the open operation of the door of the vehicle V is allowed, and the door is controlled within the allowable door open degree of the ultrasonic sensor.

Accordingly, as shown in FIG. 16B, the open operation of the door can be performed up to a position immediately before the door collides with the obstacle.

Figure 17:
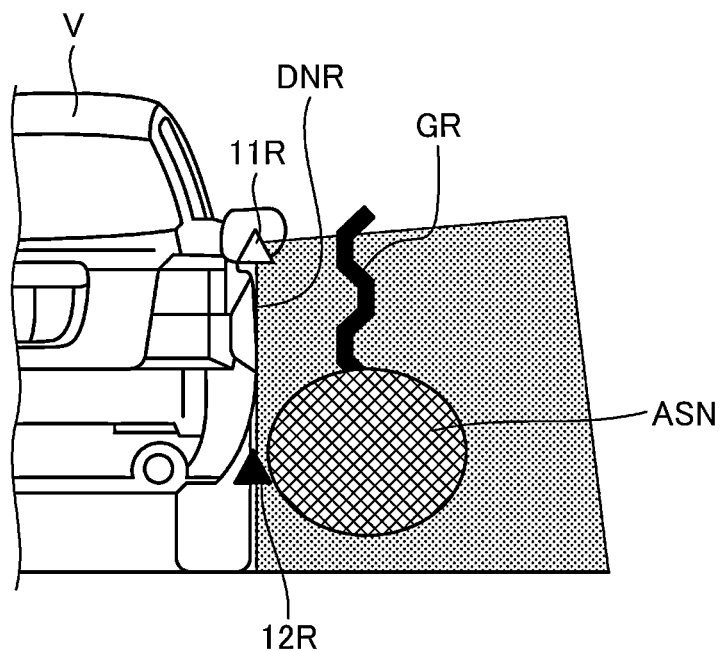
FIG. 17 is an explanatory diagram when the obstacle is a guardrail (an obstacle having a complicated shape)

FIG. 17 is an explanatory diagram when the obstacle is a guardrail (an obstacle having a complicated shape).

As shown in FIG. 17, when the obstacle is a guardrail GR, the detection result of the camera image processing unit 21 is that there is an obstacle, and the shape of the obstacle is a guardrail.

In contrast, in the detection result of the ultrasonic sensor signal processing unit 22, since the first ultrasonic sensor SN1 and the second ultrasonic sensor SN2 are disposed horizontally, it is determined that there is no obstacle depending on an installation situation of the guardrail GR, or a detection error is large depending on a shape of the guardrail GR. When it is detected that there is an obstacle, the shape of the obstacle is the wall-type.

As a result, the general control unit 23 determines that the detection result of the ultrasonic sensor signal processing unit 22 is unreliable, restricts the open operation of the door, and controls the door in an open operation restriction state in which the open degree of the door is restricted within a range of a width of the side mirrors of the vehicle (pop-up position), for example.

Accordingly, as shown in FIG. 16B, the open operation of the door can be performed up to a position immediately before the door collides with the obstacle.

Figure 18:
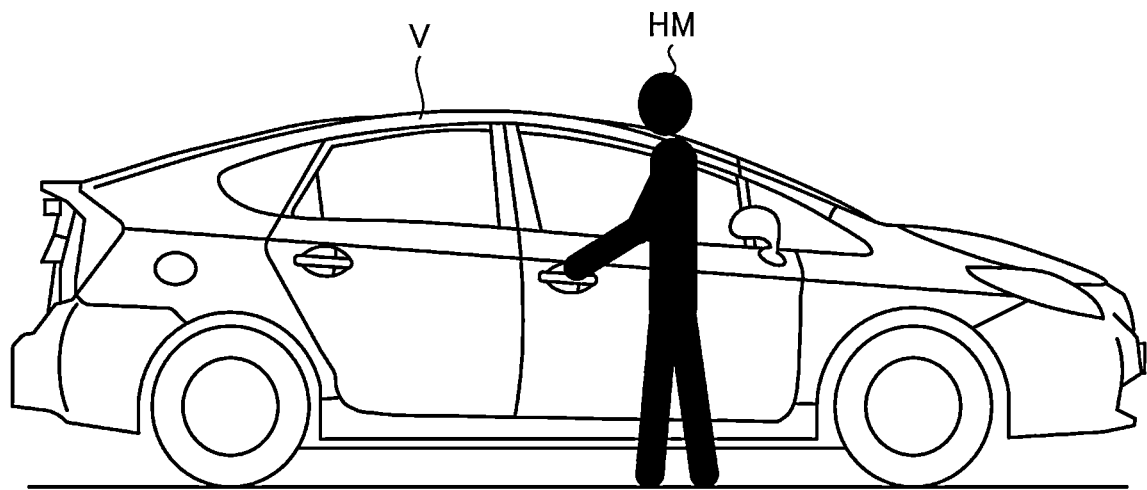
FIG. 18 is an explanatory diagram when a person who is going to get on the vehicle is standing outside a door.

FIG. 18 is an explanatory diagram when a person who is going to get on the vehicle is standing outside the door.

In the determination of step S12, when the door open switch (interior of the vehicle) 14A is in an OFF state, since the door open switch (exterior of the vehicle) 14B is in the ON state, the general control unit 23 determines whether a standing position of the user is out of a trajectory range at the time of opening the door (step S18).

As shown in FIG. 18, when a person HM opens the door outside the vehicle, the detection result of the camera image processing unit 21 is that there is an obstacle, and the obstacle is a person.

The detection result of the ultrasonic sensor signal processing unit 22 is that there is an obstacle, and the shape of the obstacle is the pole-type or the wall-type.

As a result, the determination result of the general control unit 23 is that in response to detecting that the person HM has moved out of the trajectory range at the time of opening the door, open operation control of the door is performed based on the detection results of the camera image processing unit 21 and the ultrasonic sensor signal processing unit 22.

That is, in the determination of step S18, when the standing position of the person HM which is the user is out of the trajectory range at the time of opening the door (step S18; Yes), the general control unit 23 proceeds to step S13, and performs the open operation control of the door based on the detection results of the camera image processing unit 21 and the ultrasonic sensor signal processing unit 22 according to the procedure described above.

In the determination of step S18, when the standing position of the person HM which is the user is within the trajectory range at the time of opening the door (step S18; No), it is determined whether a predetermined time has elapsed since the door open switch (exterior of the vehicle) 14B is in the ON state (step S19).

In the determination of step S19, when it is determined that the predetermined time has not elapsed since the door open switch (exterior of the vehicle) 14B is in the ON state (step S19; No), the general control unit 23 proceeds to step S18 and enters a standby state.

In the determination of step S19, when the predetermined time has elapsed since the door open switch (exterior of the vehicle) 14B is in the ON state (step S19; No), the general control unit 23 performs the open operation control of the door by restricting the open operation of the door, and ends the process since reliability of the detection result of the ultrasonic sensor signal processing unit 22 is low (step S20).

In the determination of step S13, when there is no obstacle in the door trajectory (step S13; No), the general control unit 23 determines that the open operation of the door is possible since there is no obstacle, controls the door drive unit 15 by the door control unit 24, performs the door open operation, and ends the process (step S17).

As described above, according to the first embodiment, in an area within the door trajectory at the time of opening the door when a signal for performing the open operation is input from the door open switches 14A and 14B that perform the open operation on the door, since the open control of the door is allowed when estimation results of the presence or absence of the obstacle and the shape of the obstacle corresponding to the detection results of the camera image processing unit 21 and the ultrasonic sensor signal processing unit 22 match, even if the obstacle has a shape that is difficult to be detected by the ultrasonic sensors SN1 and SN2, the door can be prevented from colliding with the obstacle.

In addition, when the distance to the obstacle is detected by the camera image processing unit 21 and the ultrasonic sensor signal processing unit 22 and the detection results are substantially equal (when the detection results can be regarded as the same), since the open operation up to the front of the obstacle is allowed, even if the obstacle has a shape that is difficult to be detected by the ultrasonic sensors SN1 and SN2, the door can be prevented from colliding with the obstacle.

Further, when the signal for performing the open operation on the door is input from the door open switch 14B provided outside the vehicle, since the open operation of the door is restricted when the person is detected in the door trajectory at the time of opening the door and the open control of the door is allowed as usual when the person moves out of the door trajectory within a predetermined time, a person who is going to get on the vehicle V can be prevented from being determined as an obstacle and the open operation of the door can be prevented from being unnecessarily restricted.

[2] Second Embodiment

In the first embodiment, a configuration is used in which two ultrasonic sensors, that is, the first ultrasonic sensor SN1 and the second ultrasonic sensor SN2, are used as the ultrasonic sensor groups 12-1 to 12-$n$, whereas in the second embodiment, one ultrasonic sensor SN is provided for each corresponding door instead of the ultrasonic sensor groups 12-1 to 12-$n$.

Also in this case, a configuration of an obstacle detection device is the same as that of the first embodiment, the description thereof will be appropriately incorporated.

Figure 19:
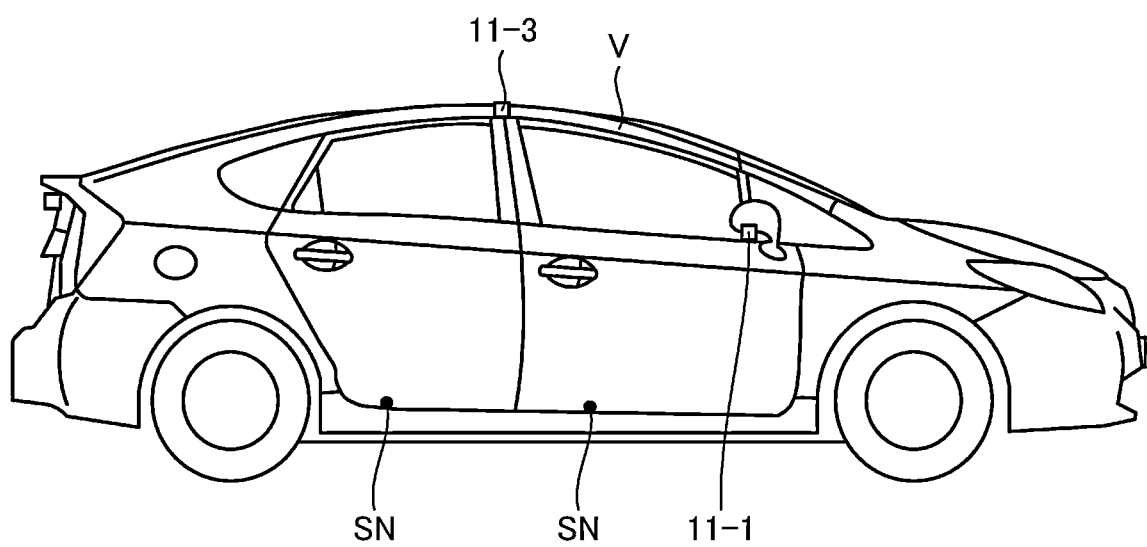
FIG. 19 is a right side view of a vehicle including an obstacle detection device according to a second embodiment.

FIG. 19 is a right side view of a vehicle including the obstacle detection device according to the second embodiment.

As shown in FIG. 19, the ultrasonic sensor SN is provided at a lower portion of each door.

Figure 20:
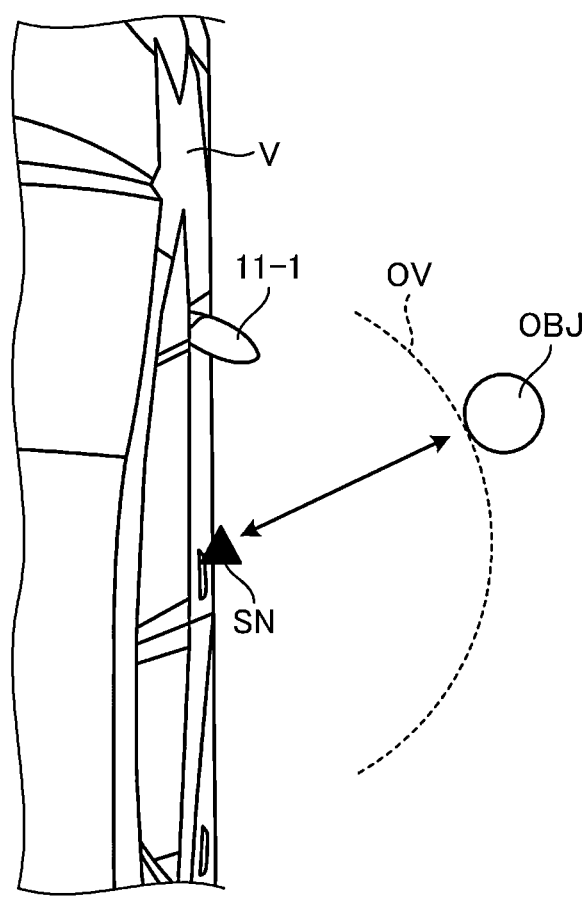
FIG. 20 is an explanatory diagram of a detection state of an ultrasonic sensor.

FIG. 20 is an explanatory diagram of a detection state of the ultrasonic sensor.

When only one ultrasonic sensor SN is provided as shown in FIG. 19, the distance to the obstacle OBJ can be calculated as shown in FIG. 20, but it can only be determined that the obstacle OBJ exists on any position of a circumference as shown by a broken line curve OV in FIG. 20.

That is, the ultrasonic sensor signal processing unit 22 of the second embodiment cannot determine whether the obstacle is within a door trajectory range at the time of opening the door when the door is fully-closed, or determine the shape of the obstacle.

Figure 21:
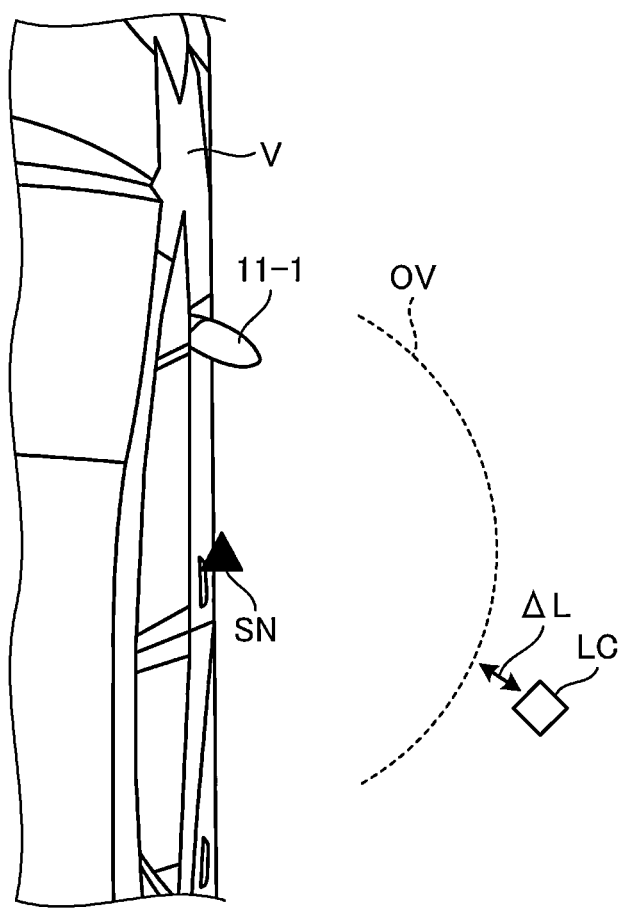
FIG. 21 is an explanatory diagram of detection distance comparison.

FIG. 21 is an explanatory diagram of detection distance comparison.

Therefore, in the second embodiment, comparison with the detection result of the camera image processing unit 21 is not performed, and the detection result of the camera image processing unit 21 and a distance detection result of the ultrasonic sensor signal processing unit 22 are compared as shown in FIG. 21.

Figure 22:
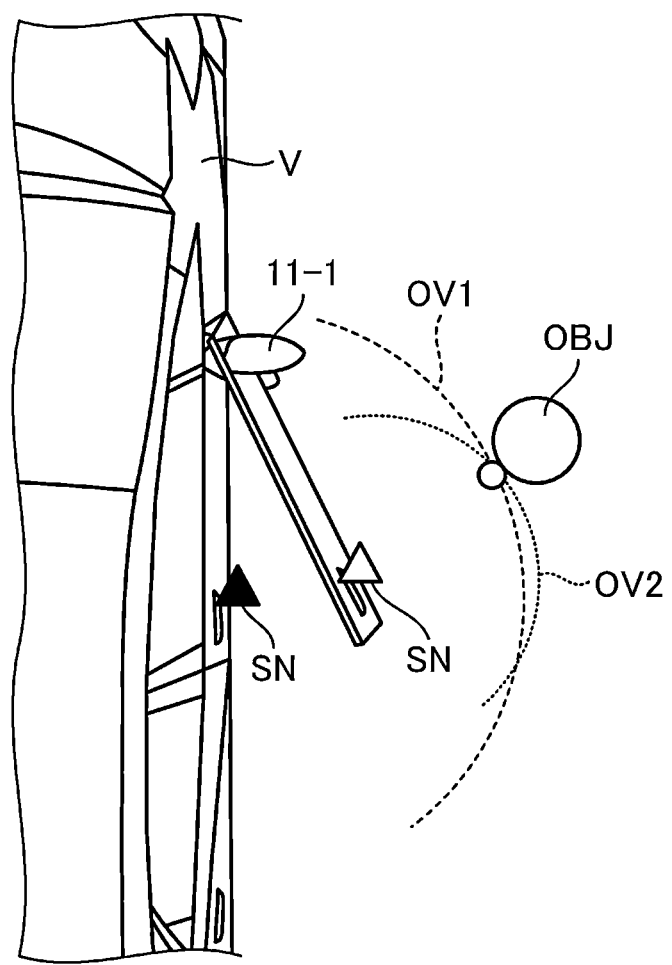
FIG. 22 is an explanatory diagram of position detection of a pole-type obstacle by the ultrasonic sensor when the door is opened.

FIG. 22 is an explanatory diagram of position detection of the pole-type obstacle by the ultrasonic sensor when the door is opened.

As shown in FIG. 22, since when the door is opened, the vehicle V is stopped and a distance between the ultrasonic sensor SN and the obstacle OBJ gradually changes according to a opened state of the door, the general control unit 23 specifies a position of the pole-type obstacle OBJ based on a setting that the obstacle OBJ is positioned at an intersection of a curve OV1 and a curve OV2 representing the distance to the obstacle OBJ according to the opened state of the door to perform the open control of the door.

Figure 23:
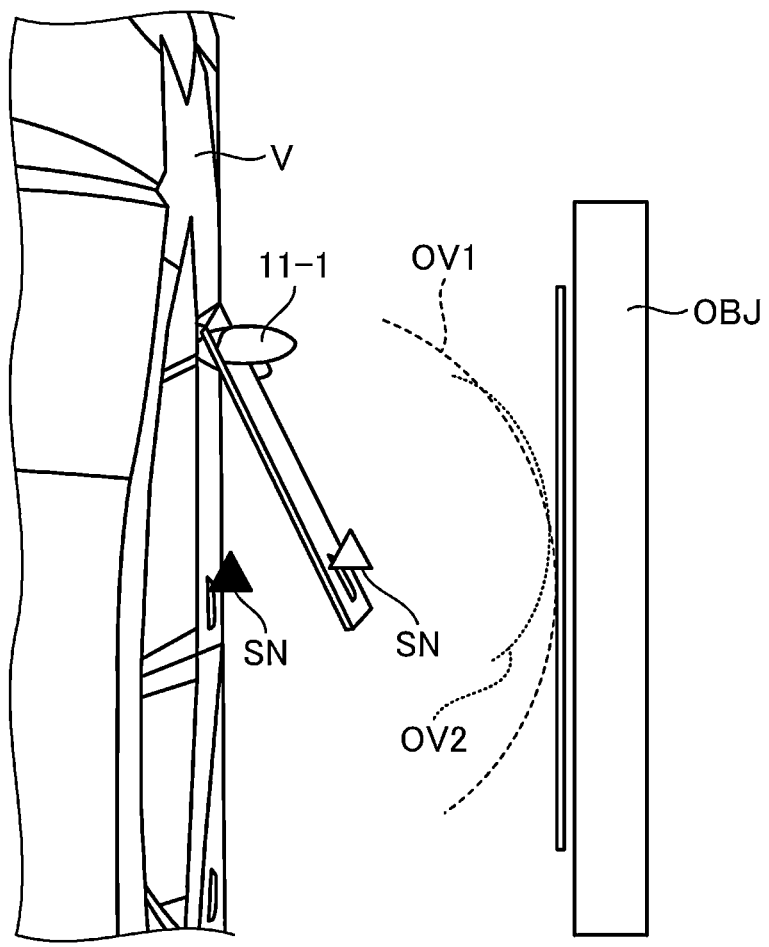
FIG. 23 is an explanatory diagram of position detection of a wall-type obstacle by the ultrasonic sensor when the door is opened.

FIG. 23 is an explanatory diagram of position detection of the wall-type obstacle by the ultrasonic sensor when the door is opened.

As shown in FIG. 23, when the door is opened, the vehicle V is stopped, and the distance between the ultrasonic sensor SN and the obstacle OBJ changes substantially constant according to the opened state of the door.

Therefore, the general control unit 23 specifies a position of the wall-type obstacle OBJ based on a setting that the obstacle OBJ is positioned along an extension direction of a tangent line of the curve OV1 and the curve OV2 representing the distance to the obstacle OBJ according to the opened state of the door to perform the open control of the door.

As described above, according to the second embodiment, when the distance to the obstacle is detected by the camera image processing unit 21 and the ultrasonic sensor signal processing unit 22 and the detection results are substantially equal (when the detection results can be regarded as the same), since the open operation up to the front of the obstacle is allowed, even if the obstacle has a shape that is difficult to be detected by the ultrasonic sensors SN1 and SN2, the door can be prevented from colliding with the obstacle.

[3] Third Embodiment

Figure 24:
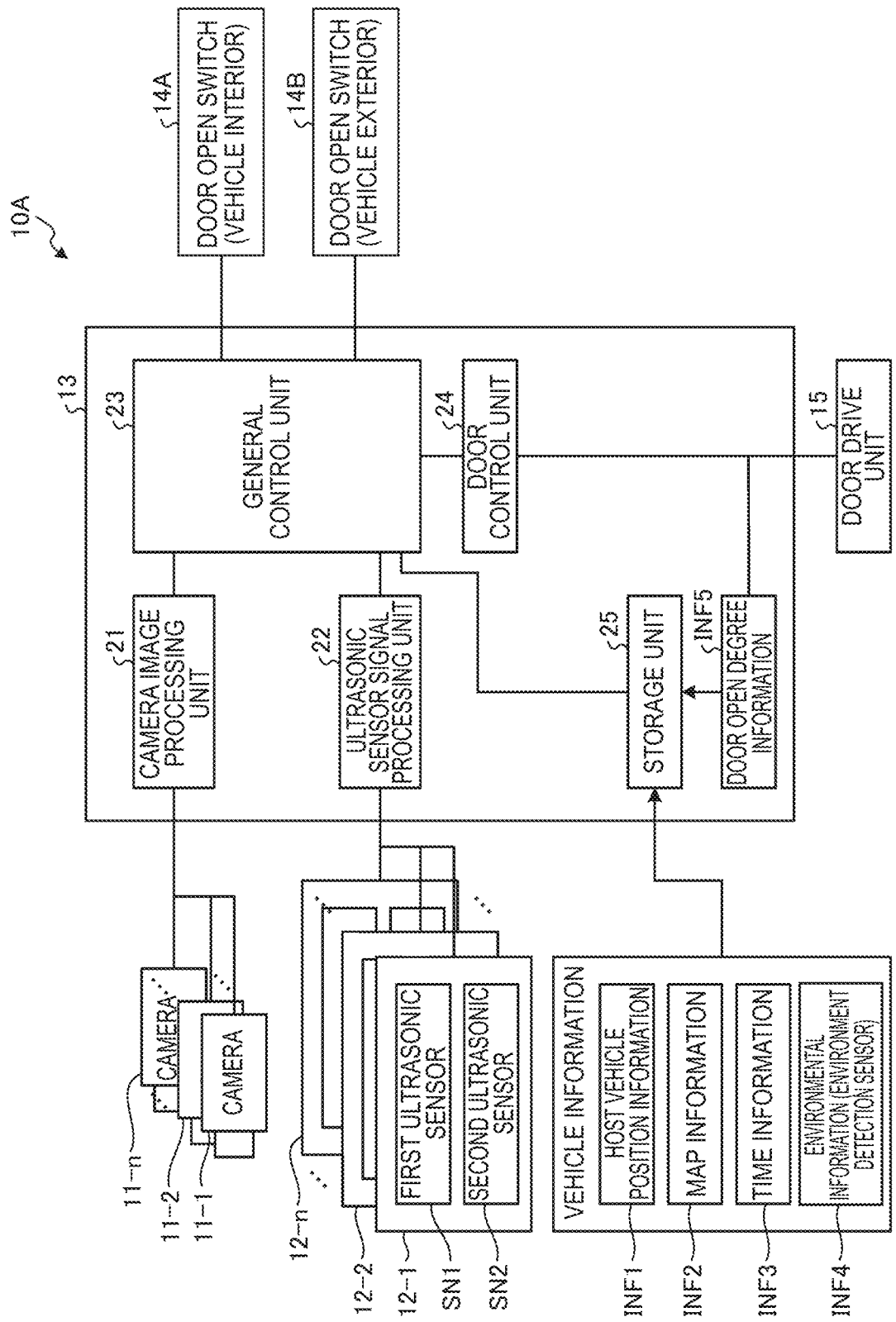
FIG. 24 is a schematic configuration block diagram of an obstacle detection device according to a third embodiment.

FIG. 24 is a schematic configuration block diagram of an obstacle detection device according to a third embodiment.

In FIG. 24, the same parts as those of the first embodiment in FIG. 1 are denoted by the same reference numerals, and the detailed description thereof will be incorporated.

An obstacle detection device 10A of FIG. 24 is different from the obstacle detection device 10 of FIG. 1 in that the obstacle detection device 10A includes a storage unit 25 that stores input vehicle information and door open degree information INF5 output by the door control unit 24, and performs image processing for improving detection sensitivity and the detection accuracy in the camera image processing unit 21.

In the above configuration, the vehicle information includes host vehicle position information INF1, map information INF2, time information INF3, and environmental information INF4.

The host vehicle position information INF1 is, for example, GPS information such as latitude and longitude information, and is information indicating a position of a host vehicle.

The map information INF2 is information for acquiring topographical information for knowing a positional relationship with the sun on a southern slope of a mountain or the like.

The time information INF3 includes current time information, and is information for knowing a positional relationship with the sun in cooperation with the position information of the vehicle.

The environmental information INF4 includes, for example, illuminance information for each of the plurality of cameras 11-1 to 11-n, and is input from an illuminance sensor or the like.

The door open degree information INF5 is used to correct an orientation of the camera provided in the door of the vehicle with respect to an orientation of the vehicle.

FIG. 25 is an explanatory diagram of a principle of the third embodiment.

The principle of the third embodiment will be described with reference to FIG. 25.

A problem occurs that the cameras 11-1 to 11-n are likely to be affected by brightness, and are likely to be affected by the brightness even in object recognition by machine learning. For example, a problem occurs that a boundary line with an object cannot be correctly recognized due to a shadow.

Therefore, in the third embodiment, by knowing a relationship between a light source (the sun, street light (fluorescent light), or the like. Especially an influence from the sun is large) and the position of the vehicle from the vehicle position, a vehicle traveling direction, and a time and adjusting the brightness of the cameras 11-1 to 11-n, the object recognition can be easily performed.

More specifically, as shown in FIG. 25, for example, it is assumed that a vehicle CAR is irradiated with sunlight from the sun SUN.

In this case, since an area AR_BR on the sun side of the vehicle is in a state of being irradiated with the sunlight, an amount of incident light of the camera provided on the side increases.

In contrast, since an amount of the sunlight is reduced in an area AR_SH which is a back side of the vehicle CAR with respect to the sun SUN, the amount of the incident light of the camera provided on the side decreases.

Therefore, in the third embodiment, by adjusting the brightness of the captured image based on the positional relationships between the cameras 11-1 to 11-n and the light source (sun or the like) and a brightness (illuminance) of a surrounding environment, the object recognition can be easily performed in any of the cameras 11-1 to 11-n.

Next, an operation of the third embodiment will be described.

Figure 26:
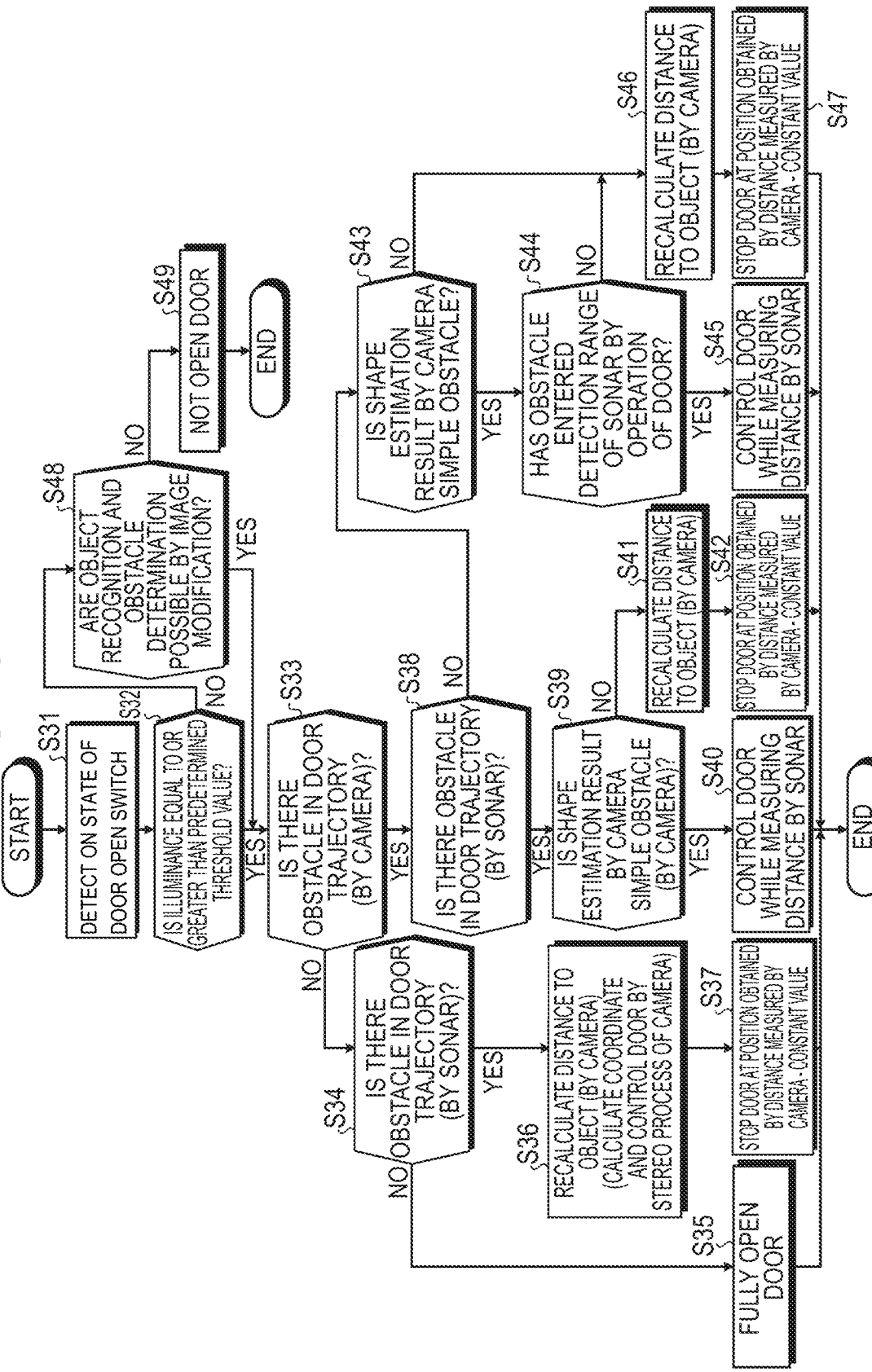
FIG. 26 is a processing flowchart of the third embodiment.

FIG. 26 is a processing flowchart of the third embodiment.

When an ON state of a door open switch is detected (step S31), it is determined whether the illuminance is equal to or greater than a predetermined threshold value, that is, whether the vehicle CAR is in an irradiation state with the sunlight or the like (step S32).

In the determination of step S32, when the illuminance is equal to or greater than the threshold value (step S32; Yes), it is determined whether there is an obstacle in the door trajectory when the door is opened based on the captured image of the camera (step S33).

In the determination of step S33, when it is determined that there is no obstacle in the door trajectory (step S33; No), it is determined whether there is an obstacle in the door trajectory at the time of opening the door based on an output signal of the ultrasonic sensor (step S34).

In the determination of step S34, when it is determined that there is no obstacle in the door trajectory (step S34; No), first, the door is opened to the pop-up position, then the door is fully-opened (step S35), and the process is ended.

In the determination of step S34, when it is determined that there is an obstacle in the door trajectory (step S34; Yes), first, the door is opened to the pop-up position, and a distance to an object is recalculated based on a plurality of captured images (step S36).

More particularly, the distance to the obstacle (a distance measured by the camera) is calculated using the principle of a stereo camera based on a captured image of the camera when the door is closed and one or plurality of captured images obtained by capturing an image by the camera while gradually opening the door toward the pop-up position after the door is opened (step S36).

Herein, recalculating the distance to the object based on the captured images by the plurality of cameras will be described in more detail.

Figure 27:
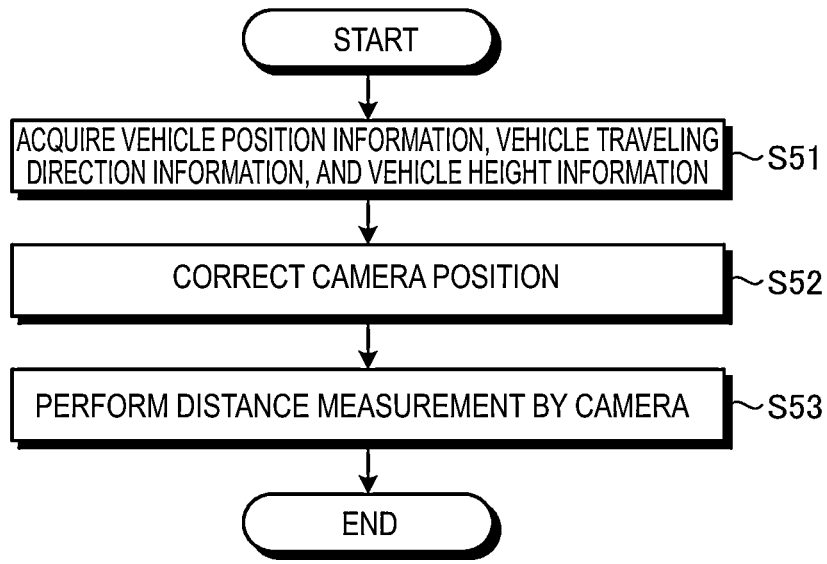
FIG. 27 is a processing flowchart of distance recalculation.

FIG. 27 is a processing flowchart of distance recalculation.

In the recalculation, by adjusting the brightness based on the positional relationship between the cameras 11-1 to 11-n and the light source, in order to make it easier to perform the object recognition in any of the cameras 11-1 to 11-n, the host vehicle position information INF1 (corresponding to the vehicle position), a history of the host vehicle position information INF1 (corresponding to the vehicle traveling direction information), and vehicle height information, which are the vehicle information, are acquired (step S51).

Subsequently, the camera image processing unit 21 corrects a camera position based on the information obtained in step S51 (step S52).

Accordingly, the general control unit 23 performs distance measurement to the obstacle, which is an object, based on a captured image and a corrected camera position output by the camera image processing unit 21 (step S53).

Then, a position obtained by subtracting a preset constant value for ensuring safety from the distance to the obstacle (the distance measured by the camera) obtained in step S36 is set as a maximum door open degree position, the door is opened up to the front of the obstacle, then the door is stopped, and the process is ended (step S37).

On the other hand, in the determination of step S33, when it is determined that there is an obstacle in the door trajectory (step S33; Yes), it is determined whether there is an obstacle in the door trajectory at the time of opening the door based on the output signal of the ultrasonic sensor (step S38).

In the determination of step S38, when it is determined that there is an obstacle in the door trajectory (step S38; Yes), it is determined whether the estimation result of the shape of the obstacle is a simple obstacle having a simple shape such as the pole or the wall based on the captured image of the camera (step S39).

Figure 28:
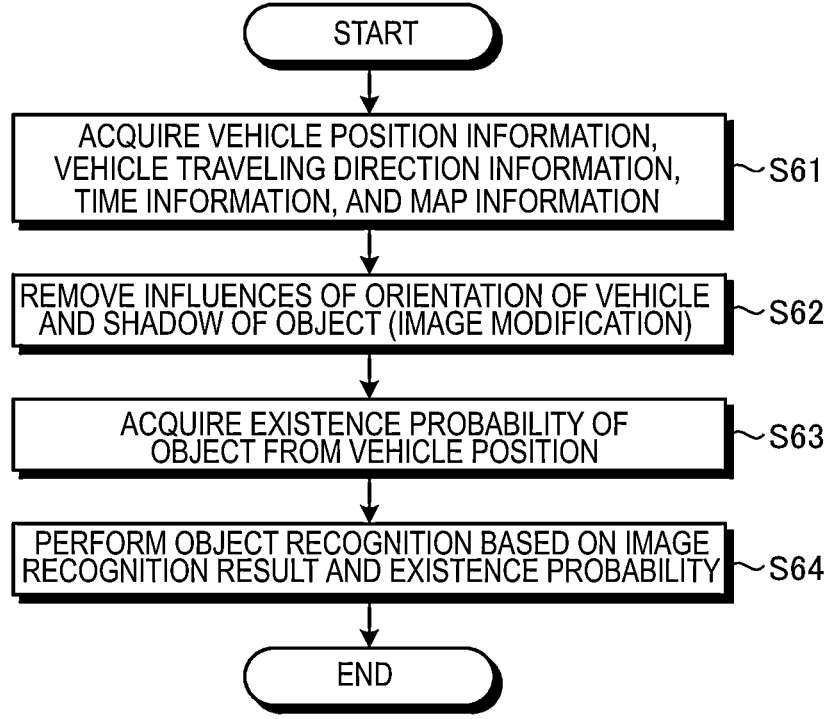
FIG. 28 is a processing flowchart of image recognition.

FIG. 28 is a processing flowchart of image recognition.

Then, in the determination of step S39, by further adjusting the brightness based on the positional relationship between the cameras 11-1 to 11-*n* and the light source, in order to make it easier to perform the object recognition in any of the cameras 11-1 to 11-*n*, the host vehicle position information INF1 (corresponding to the vehicle position), the history of the host vehicle position information INF1 (corresponding to the vehicle traveling direction information), and the time information INF3 (corresponding to position information of the sun, which is the light source, and daytime and nighttime information), which are the vehicle information, are acquired (step S61).

Subsequently, the camera image processing unit 21 performs image modification (image correction) of removing influences of the orientation of the vehicle and a shadow of the object such as the obstacle based on the information obtained in step S61 (step S62).

The general control unit 23 acquires an existence probability of the object preset from the vehicle position and the map information (step S63).

Then, the general control unit 23 performs the image recognition on an image in consideration of light from the light source obtained in step S62, and combines the existence probability of the object acquired in step S63 to perform the object recognition (step S64).

When the vehicle position is a position where the vehicle was stopped in the past, a past object recognition result may also be used.

According to steps S61 to S64, the influence of the light source such as the sun can be removed by utilizing the time information and vehicle traveling information, and the object can be easily recognized correctly.

By utilizing the vehicle position information or the map information and referring to an existence probability table of the object depending on a current position of the vehicle (where the vehicle is now), erroneous recognition in the object recognition can be avoided.

In the determination of step S39, when the estimation result of the shape of the obstacle based on the captured image of the camera is the simple obstacle (step S39; Yes), since a distance measurement result by the ultrasonic sensor has reliability, the open control of the door is performed while measuring the distance to the obstacle based on the output signal of the ultrasonic sensor, and the process is ended (step S40).

In the determination of step S39, when the estimation result of the shape of the obstacle based on the captured image of the camera is not the simple obstacle (step S39; No), since the reliability of the distance measurement result by the ultrasonic sensor is low, the door is opened to the pop-up position, and the distance to the obstacle which is an object is recalculated by the camera again based on the capturing of the camera (step S41).

Also in this case, similarly to the case of step S36, as shown in FIG. 27, the host vehicle position information INF1 (corresponding to the vehicle position), the history of the host vehicle position information INF1 (corresponding to the vehicle traveling direction information), and the vehicle height information, which are the vehicle information, are acquired (step S51), and the camera position is corrected (step S52). As a result, the general control unit 23 performs the distance measurement to the obstacle, which is an object, based on the captured image and the corrected camera position output by the camera image processing unit 21 (step S53).

Then, a position obtained by subtracting a preset constant value for ensuring safety from the distance to the obstacle (the distance measured by the camera) obtained in step S41 is set as the maximum door open degree position, the door is opened up to the front of the obstacle, then the door is stopped, and the process is ended (step S42).

Further, in the determination of step S38, when it is determined that there is no obstacle in the door trajectory (step S38; No), it is determined whether the estimation result of the shape of the obstacle is the simple obstacle having a simple shape such as the pole or the wall based on the captured image of the camera (step S43).

Also in this case, steps S61 to S64 shown in FIG. 28 may be performed.

In the determination of step S43, when it is determined that the estimation result of the shape of the obstacle based on the captured image of the camera is not the simple obstacle (step S39; No), the process proceeds to step S46 described hereinafter.

In the determination of step S43, when the estimation result of the shape of the obstacle based on the captured image of the camera is the simple obstacle (step S39; Yes), the door is opened to the pop-up position, and in this state, it is determined whether the obstacle, which is an object, has entered the detection range of the ultrasonic sensor (step S44).

In the determination of step S44, when the obstacle, which is an object, has entered the detection range of the ultrasonic sensor (step S44; Yes), since the distance measurement result by the ultrasonic sensor has the reliability, the open control of the door is performed while measuring the distance to the obstacle based on the output signal of the ultrasonic sensor, and the process is ended (step S45).

In the determination of step S44, when the obstacle, which is an object, has not entered the detection range of the ultrasonic sensor (step S44; No), first, the door is opened to the pop-up position, and the distance to the object is recalculated based on the images captured by the plurality of cameras (step S46).

In step S46, since the reliability of the distance measurement result by the ultrasonic sensor is low, the door is opened to the pop-up position, and the distance to the obstacle which is an object is recalculated by the camera again based on the capturing of the camera.

Herein, recalculating the distance to the object based on the captured images of the plurality of cameras will be described in more detail.

Also in step S46 in this case, similarly to the case of step S36, as shown in FIG. 27, the host vehicle position information INF1 (corresponding to the vehicle position), the history of the host vehicle position information INF1 (corresponding to the vehicle traveling direction information), and the vehicle height information, which are the vehicle information, are acquired (step S51), and the camera position is corrected (step S52).

The correction in step S52 may also be used for the correction when performing a determination as to whether the obstacle is inside the door trajectory in step S33.

As a result, the general control unit 23 performs the distance measurement to the obstacle, which is an object, based on the captured image and the corrected camera position output by the camera image processing unit 21 (step S53).

Also in this case, steps S61 to S64 shown in FIG. 28 may be performed.

Then, a position obtained by subtracting a preset constant value for ensuring safety from the distance to the obstacle (the distance measured by the camera) calculated in step S46 through step S53 is set as the maximum door open degree position, the door is stopped after opening the door up to the front of the obstacle, and the process is ended (step S47).

On the other hand, in the determination of step S32, when the illuminance is less than the threshold value (step S32; No), the general control unit 23 determines whether the object recognition and the obstacle determination are possible by the image modification (for example, the brightness correction or the like) (step S48).

In the determination of step S48, when the object recognition and the obstacle determination are possible by the image modification (for example, the brightness correction or the like) (step S48; Yes), the process proceeds to step S33, and the open control of the door is performed in the same procedure as described above.

In the determination in step S48, when the object recognition and the obstacle determination are impossible even if the image modification is performed (when the screen is too dark and is in a so-called blackout state), since the obstacle or the distance to the obstacle cannot be calculated, the door cannot be opened and the process is ended (step S49).

As described above, according to the third embodiment, the brightness of the captured image is adjusted based on the positional relationship between the cameras 11-1 to 11-n and the light source (the sun or the like) and the brightness (illuminance) of the surrounding environment, the existence probability of the object (an object such as the obstacle) is known based on a previous image recognition result and the like, and the distance to the object is measured, and therefore, the distance to the obstacle can be known with higher accuracy, and the open control of the door can be performed more reliably.

Figure 29:
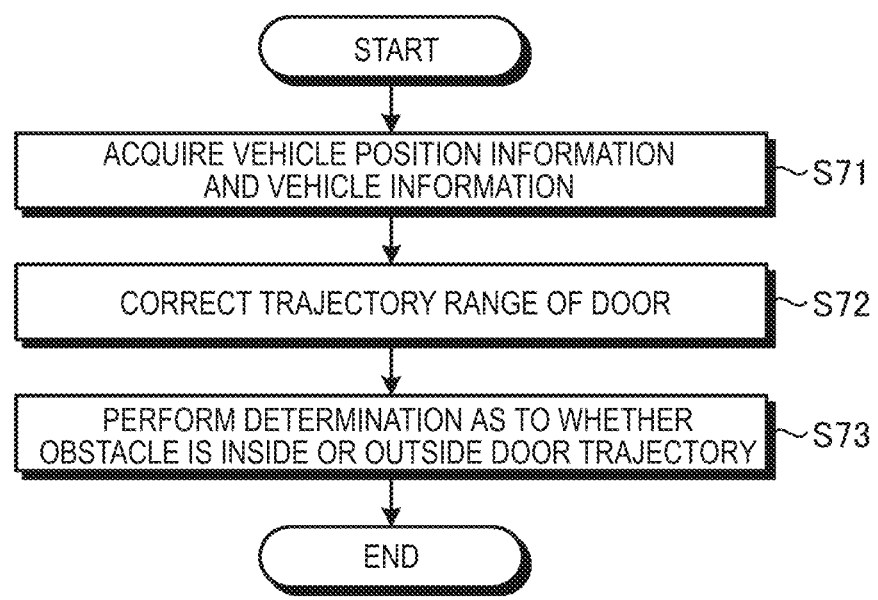
FIG. 29 is an explanatory diagram of a modification of the third embodiment.

FIG. 29 is an explanatory diagram of a modification of the third embodiment.

In the above description, when it is determined whether there is an obstacle in the door trajectory when the door is opened (step S33), the determination is performed based on the captured image of the camera, but a way to get images by the camera and the trajectory range of the door may change depending on a vehicle condition (an inclination of the vehicle) and a road condition.

Therefore, as shown in FIG. 29, the vehicle information (the inclination of the vehicle) and the vehicle position information (for example, the vehicle is on a slope) are acquired (step S71), and the trajectory range of the door is corrected (step S72).

Then, a determination as to whether the obstacle is inside or outside the door trajectory is performed based on the corrected trajectory range of the door (step S73).

As a result, the determination as to whether the obstacle is inside or outside the door trajectory can be performed more accurately.

[4] Modification of Embodiment

In the embodiments described above, the obstacle detection device 10 includes, but is not limited to, for example, one controller (ECU) 13. The obstacle detection device 10 may include a plurality of ECUs. For example, one ECU may be responsible for functions of the camera image processing unit 21 and the ultrasonic sensor signal processing unit 22, and the other ECU may be responsible for functions of the general control unit 23 and the door control unit 24.

In the first embodiment described above, each of the ultrasonic sensor groups 12-1 to 12-n includes, but are not limited to, the first ultrasonic sensor SN1 and the second ultrasonic sensor SN2 disposed in the front-rear direction of the vehicle. For example, three or more ultrasonic sensors may be provided for one door. By increasing the number of the ultrasonic sensor, a wider range of objects can be detected with higher accuracy.

In the above description, a case where the ultrasonic sensor is used as a distance measurement sensor has been described, but the distance measurement sensor, such as the radio wave sensor or an infrared sensor, may be used in addition to the ultrasonic sensor, for example.

An obstacle detection device according to an aspect of this disclosure includes: an ultrasonic sensor signal processing unit configured to detect at least a distance to an obstacle among the distance to the obstacle and a shape of the obstacle based on an output of an ultrasonic sensor, the ultrasonic sensor being disposed on a door of a vehicle and configured to detect the distance to the obstacle within a predetermined detection range by an ultrasonic wave; a camera image processing unit configured to detect the distance to the obstacle and the shape of the obstacle based on an output of a camera of the vehicle, the camera being configured to capture an image of an area including a trajectory range when the door of the vehicle is opened and a detection range of the ultrasonic sensor; and a controller configured to perform open operation control of the door based on a detection result of the ultrasonic sensor signal processing unit and a detection result of the camera image processing unit.

According to the above configuration, the door can be stopped immediately before the collision with the obstacle, and the collision with the obstacle can be avoided in various situations.

The ultrasonic sensor signal processing unit may be configured to detect the distance to the obstacle and the shape of the obstacle based on outputs of a plurality of the ultrasonic sensors disposed on one door.

According to the configuration, detection accuracy and reliability may be further improved.

The controller may be configured to allow open control of the door when it is determined that the distances to the obstacle are regarded as the same and the shapes of the obstacle are also the same in the detection results of the ultrasonic sensor signal processing unit and the camera image processing unit.

According to the above configuration, the open control can be performed more reliably.

The controller may be configured to allow the open control of the door up to the front of the obstacle when the distances to the obstacle are regarded as the same in the detection results of the ultrasonic sensor signal processing unit and the camera image processing unit.

According to the above configuration, the open control of the door can be performed based on the detection result of the ultrasonic sensor with higher measurement accuracy.

The controller may be configured to allow the open control of the door when a signal for performing an open operation of the door is input outside the vehicle, a person is detected inside the trajectory range based on the detection result of the camera image processing unit, and the person moves out of the trajectory range.

According to the above configuration, a person who is going to get on the vehicle can be prevented from being treated as an obstacle and the open control of the door can be normally performed.

One ultrasonic sensor may be provided on the door, and the ultrasonic sensor signal processing unit may be configured to detect the distance to the obstacle based on distances to a plurality of obstacles obtained when the door is opened.

According to the above configuration, a device configuration can be simplified, the door can be stopped immediately before the collision with the obstacle, and the collision with the obstacle can be avoided in various situations.

The camera image processing unit may be configured to perform correction of a captured image output from the camera based on a brightness of a capturing area of the camera, and the controller may be configured to acquire an existence probability of the obstacle included in the captured image based on a corrected captured image, and perform object recognition based on the acquired existence probability.

According to the above configuration, the obstacle can be known with high accuracy by reducing an influence of external light such as the sun, and thus the distance to the obstacle can be known with high accuracy, and the open control of the door can be performed.

The controller may be configured to acquire the existence probability of the obstacle based on a capturing place of the camera, and perform the object recognition based on the acquired existence probability and a distance measurement result of a distance measurement sensor.

According to the above configuration, the obstacle can be known with high accuracy by specifying a position of external light such as the sun based on the capturing place and reducing the influence of the external light, and thus the distance to the obstacle can be known with high accuracy, and the open control of the door can be performed.

The camera image processing unit may be configured to perform brightness correction of the captured image as the correction in order to remove influences of an orientation of the vehicle and a shadow of an object, and the distance to the obstacle can be known with high accuracy by reducing an influence due to whiteout or blackout of the image, and the open control of the door can be performed.

An obstacle detection method according to an aspect of this disclosure is executed by an obstacle detection device to which an output from an ultrasonic sensor, which is disposed on a door of a vehicle and configured to detect a distance to an obstacle within a predetermined detection range by an ultrasonic wave, and an output of a camera of the vehicle, which is configured to capture an image of an area including a trajectory range when the door of the vehicle is opened and a detection range of the ultrasonic sensor, are input, the method including a first process of detecting at least the distance to the obstacle among the distance to the obstacle and a shape of the obstacle based on the output from the ultrasonic sensor, a second process of detecting the distance to the obstacle and the shape of the obstacle based on the output of the camera, and a third process of performing open operation control of the door based on detection results of the first process and the second process.

According to the above configuration, the door can be stopped immediately before the collision with the obstacle, and the collision with the obstacle can be avoided in various situations.

Although the embodiments disclosed herein have been described above, the above embodiments and the modification are merely examples, and the scope of the invention is not intended to be limited. The above embodiments and the modification can be carried out in various other forms, and various omissions, replacements, combinations, and changes can be made without departing from the scope of the invention. The configurations and shapes of the respective embodiments and the modification can be partly replaced each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An obstacle detection device comprising:
   an ultrasonic sensor signal processor configured to detect at least a distance to an obstacle among the distance to the obstacle and a shape of the obstacle based on an output of an ultrasonic sensor, the ultrasonic sensor being disposed on a door of a vehicle and configured to detect the distance to the obstacle within a predetermined detection range by an ultrasonic wave;
   a camera image processor configured to detect the distance to the obstacle and the shape of the obstacle based on an output of a camera of the vehicle, the camera being configured to capture an image of an area including a trajectory range when the door of the vehicle is opened and a detection range of the ultrasonic sensor; and
   a controller configured to perform open operation control of the door based on a comparison between a detection result of the ultrasonic sensor signal processor and a detection result of the camera image processor.

2. The obstacle detection device according to claim 1, wherein
   the ultrasonic sensor signal processor is configured to detect the distance to the obstacle and the shape of the obstacle based on outputs of a plurality of the ultrasonic sensors disposed on one door.

3. The obstacle detection device according to claim 2, wherein the controller is configured to allow open control of the door when it is determined that the distances to the obstacle are regarded as the same and the shapes of the obstacle are also the same in the detection results of the ultrasonic sensor signal processor and the camera image processor.

4. The obstacle detection device according to claim 1, wherein
the controller is configured to allow the open control of the door up to a front of the obstacle when the distances to the obstacle are regarded as the same in the detection results of the ultrasonic sensor signal processor and the camera image processor.

5. The obstacle detection device according to claim 1, wherein
the controller is configured to allow the open control of the door when a signal for performing an open operation of the door is input outside the vehicle, a person is detected inside the trajectory range based on the detection result of the camera image processor, and the person moves out of the trajectory range.

6. The obstacle detection device according to claim 1, wherein
one ultrasonic sensor is provided on the door; and
the ultrasonic sensor signal processor is configured to detect the distance to the obstacle based on distances to a plurality of obstacles obtained when the door is opened.

7. The obstacle detection device according to claim 1, wherein
the camera image processor is configured to perform correction of a captured image output from the camera based on a brightness of a capturing area of the camera; and
the controller is configured to acquire an existence probability of the obstacle included in the captured image based on a corrected captured image, and perform object recognition based on the acquired existence probability.

8. The obstacle detection device according to claim 7, wherein
the controller is configured to acquire the existence probability of the obstacle based on a capturing place of the camera, and perform the object recognition based on the acquired existence probability and a distance measurement result of a distance measurement sensor.

9. The obstacle detection device according to claim 7, wherein
the camera image processor is configured to perform brightness correction of the captured image as the correction in order to remove influences of an orientation of the vehicle and a shadow of an object.

10. The obstacle detection device according to claim 1, wherein
the controller further determines whether the shape of the obstacle detected by the camera image processor is a shape accurately detectable by the ultrasonic sensor, and restrict open operation control of the door in response to determining that the shape is not accurately detectable by the ultrasonic sensor.

11. An obstacle detection method executed by an obstacle detection device to which an output from an ultrasonic sensor, which is disposed on a door of a vehicle and configured to detect a distance to an obstacle within a predetermined detection range by an ultrasonic wave, and an output of a camera of the vehicle, which is configured to capture an image of an area including a trajectory range when the door of the vehicle is opened and a detection range of the ultrasonic sensor, are input, the method comprising:
a first process of detecting at least the distance to the obstacle among the distance to the obstacle and a shape of the obstacle based on the output from the ultrasonic sensor;
a second process of detecting the distance to the obstacle and the shape of the obstacle based on the output of the camera; and
a third process of performing open operation control of the door based on a comparison between detection results of the first process and the second process.

* * * * *